United States Patent
Lee et al.

(10) Patent No.: US 10,251,191 B2
(45) Date of Patent: Apr. 2, 2019

(54) METHOD AND APPARATUS FOR SCHEDULING REQUEST IN A WIRELESS COMMUNICATION SYSTEM

(71) Applicant: LG ELECTRONICS INC., Seoul (KR)

(72) Inventors: Eunjong Lee, Seoul (KR); Kitae Kim, Seoul (KR); Giwon Park, Seoul (KR); Jaehoon Chung, Seoul (KR); Jiwon Kang, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 15/506,709

(22) PCT Filed: Feb. 12, 2015

(86) PCT No.: PCT/KR2015/001423
§ 371 (c)(1),
(2) Date: Feb. 24, 2017

(87) PCT Pub. No.: WO2016/032077
PCT Pub. Date: Mar. 3, 2016

(65) Prior Publication Data
US 2018/0227938 A1    Aug. 9, 2018

Related U.S. Application Data

(60) Provisional application No. 62/041,627, filed on Aug. 25, 2014.

(51) Int. Cl.
*H04W 72/12* (2009.01)
*H04L 5/00* (2006.01)
(Continued)

(52) U.S. Cl.
CPC .......... *H04W 72/1268* (2013.01); *H04L 5/00* (2013.01); *H04L 27/26* (2013.01);
(Continued)

(58) Field of Classification Search
CPC ......... H04W 28/0268; H04W 28/0278; H04W 28/16–28/26
See application file for complete search history.

(56) References Cited

U.S. PATENT DOCUMENTS

2012/0099452 A1    4/2012   Dai et al.
2013/0044699 A1*   2/2013   Eriksson .......... H04W 72/1289
                                                            370/329
(Continued)

FOREIGN PATENT DOCUMENTS

WO    2009/035301    3/2009
WO    2009/096698    8/2009
(Continued)

OTHER PUBLICATIONS

PCT International Application No. PCT/KR2015/001423, International Search Report and Written Opinion dated May 27, 2015, 13 pages.
(Continued)

*Primary Examiner* — Kan Yuen
(74) *Attorney, Agent, or Firm* — Lee, Hong, Degerman, Kang & Waimey

(57) ABSTRACT

Provided are a method and apparatus for requesting scheduling for an uplink data transmission in a wireless communication system. The method may include receiving, by a user equipment, an additional scheduling request (SR) resource configuration information including additional SR resource information and buffer size information configured to the additional SR resource in addition to a default SR resource from a base station, transmitting, by the user
(Continued)

equipment, an SR through the default SR resource or the additional SR resource to the base station, receiving, by the user equipment, an uplink resource allocation information which is determined according to the resource in which the SR is transmitted from the base station, and transmitting, by the user equipment, the uplink data to the base station through a physical uplink shared channel (PUSCH) resource which is allocated by the uplink resource allocation information.

11 Claims, 23 Drawing Sheets

(51) Int. Cl.
    *H04L 27/26*     (2006.01)
    *H04W 76/10*     (2018.01)
    *H04W 72/04*     (2009.01)

(52) U.S. Cl.
    CPC ... *H04W 72/0413* (2013.01); *H04W 72/1284* (2013.01); *H04W 76/10* (2018.02); *H04W 72/042* (2013.01)

(56) References Cited

U.S. PATENT DOCUMENTS

| | | | | |
|---|---|---|---|---|
| 2014/0092855 A1* | 4/2014 | Ahn | ............ | H04W 74/0833 370/329 |
| 2014/0133436 A1* | 5/2014 | Shiizaki | ............ | H04W 72/1284 370/329 |
| 2014/0146796 A1 | 5/2014 | Yang et al. | | |
| 2015/0146677 A1* | 5/2015 | Ito | ............ | H04W 4/70 370/329 |

FOREIGN PATENT DOCUMENTS

| | | |
|---|---|---|
| WO | 2013/067677 | 5/2013 |
| WO | 2014030193 | 2/2014 |

OTHER PUBLICATIONS

Korean Intellectual Property Office Application Serial No. 10-2016-7036482, Office Action dated Oct. 2, 2018, 6 pages.

3rd Generation Partnership Project (3GPP), "Technical Specification Group Radio Access Network; Evolved Universal Terrestrial Radio Access (E-UTRA); Multiplexing and channel coding (Release 12)," 3GPP TS 36.212 V12.0.0, Dec. 2013, 88 pages.

3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.2.0, Jun. 2014, 207 pages.

3rd Generation Partnership Project (3GPP), "Technical Specification Group Radio Access Network; Evolved Universal Terrestrial Radio Access (E-UTRA); Radio Resource Control (RRC); Protocol Specification (Release 11)," 3GPP TS 36.331 V11.8.0, Jun. 2014, 354 pages.

NEC, "On seperate PUCCH and RA procedure for SeNB in dual connectivity," 3GPP TSG-RAN WG1 #76, R1-140488, Feb. 2014, 5 pages.

NSN (Rapporteur), "Discussion on Uplink Bearer Split," 3GPP TSG-RAN WG2 #85bis, R2-141102, Apr. 2014, 27 pages.

* cited by examiner

FIG. 2
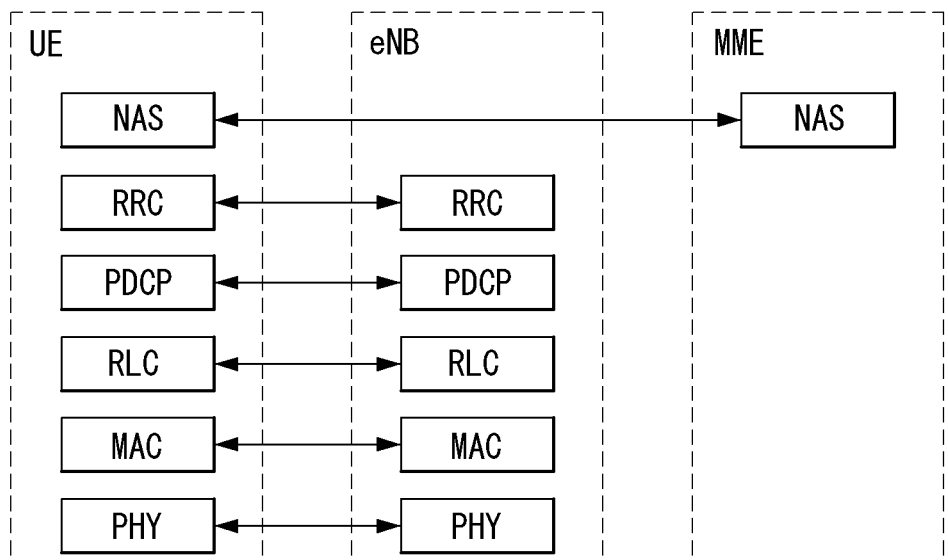
(a) CONTROL PLANE PROTOCOL STACK
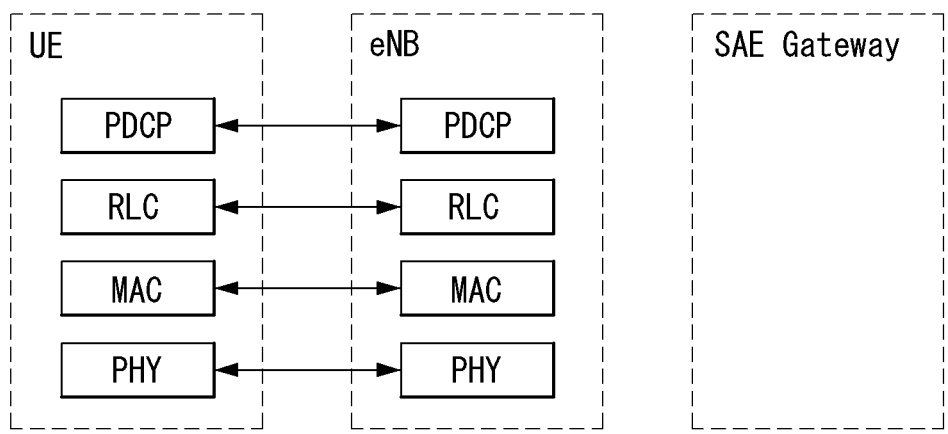
(b) USER PLANE PROTOCOL STACK

| CIF (3) | 0/ 1A | FH | Resource block assignment | MCS/RV (5) | NDI | TPC (2) | DM RS CS(3) | DAI (2) | CQI req. | SRS | RAT |

FIG. 14
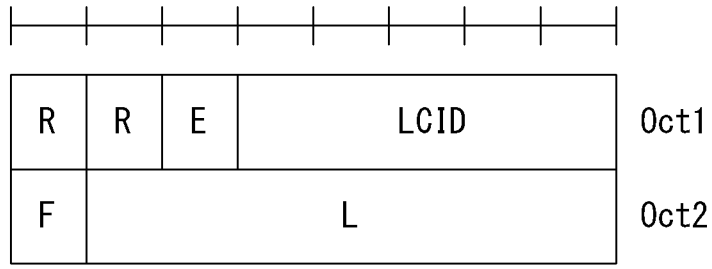
(a) R/R/E/LCID/F/L sub-header with 7-bit L field
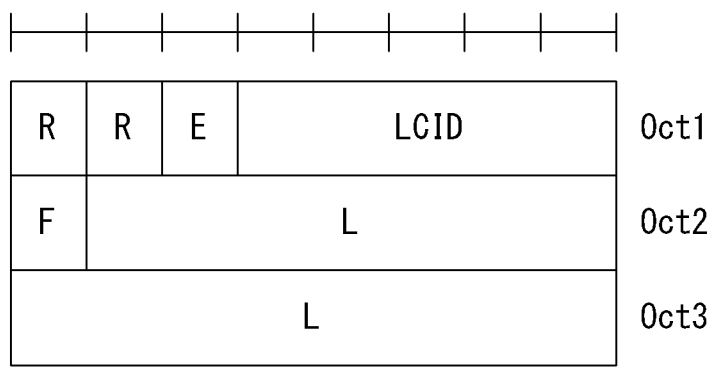
(b) R/R/E/LCID/F/L sub-header with 15-bit L field
FIG. 15
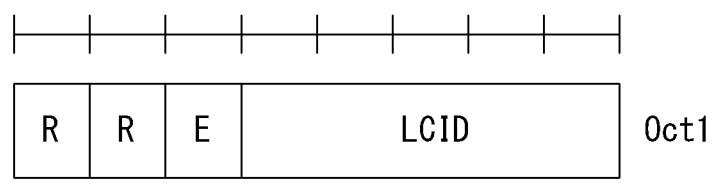
R/R/E/LCID sub-header FIG. 18
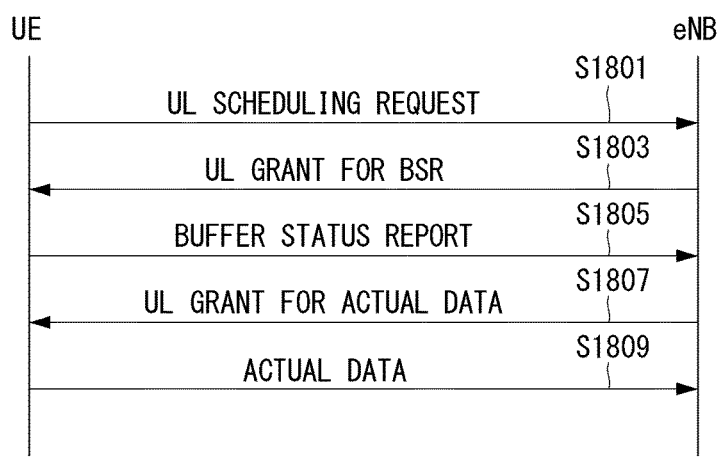
(a)
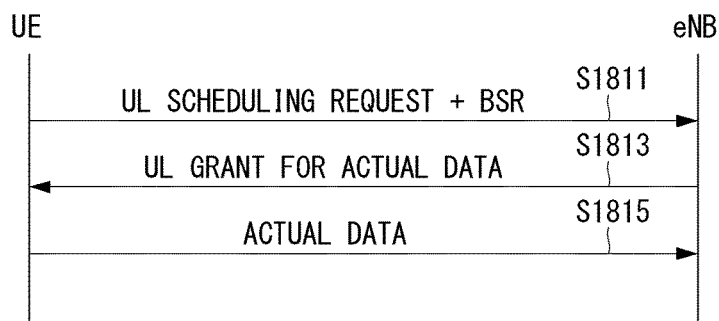
(b)

METHOD AND APPARATUS FOR SCHEDULING REQUEST IN A WIRELESS COMMUNICATION SYSTEM

TECHNICAL FIELD

The present invention relates to wireless communications and, more particularly, to a method for requesting scheduling by a user equipment to a base station through scheduling request resources additionally allocated and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In mobile communication systems, in order to maximize resource utilization, a method of transmitting and receiving data through a resource allocation procedure based on base station scheduling. However, this causes to increase latency in uplink data transmission of a user equipment.

In order to solve the above problem, the present invention proposes to define a contention-based radio resource region to minimize latency of a user equipment in wireless communication systems.

In addition, the present invention also proposes a method for rapidly performing the uplink data transmission of a user equipment, in case that the uplink data to be transmitted by a UE is generated from an application which is sensitive to delay or in case of transmitting the intermittent data of small size.

Additionally, the present invention proposes to define a scheduling request signal in order to rapidly transmit the uplink data generated from an application which is sensitive to delay or that of small size which occurs intermittently.

The technical problems solved by the present invention are not limited to the above technical problems and those skilled in the art may understand other technical problems from the following description.

Technical Solution

In an aspect, a method for requesting scheduling for an uplink data transmission in a wireless communication system is provided. The method may include receiving, by a user equipment, an additional scheduling request (SR) resource configuration information including additional SR resource information and buffer size information configured to the additional SR resource in addition to a default SR resource from a base station, transmitting, by the user equipment, an SR through the default SR resource or the additional SR resource to the base station, receiving, by the user equipment, an uplink resource allocation information which is determined according to the resource in which the SR is transmitted from the base station, and transmitting, by the user equipment, the uplink data to the base station through a physical uplink shared channel (PUSCH) resource which is allocated by the uplink resource allocation information.

In another aspect, a user equipment for requesting scheduling for an uplink data transmission in a wireless communication system is provided. The user equipment may include a radio frequency (RF) unit for transmitting and receiving a radio signal, and a processor, wherein the process is configured to perform: receiving, by a user equipment, an additional scheduling request (SR) resource configuration information including additional SR resource information and buffer size information configured to the additional SR resource in addition to a default SR resource from a base station, transmitting, by the user equipment, an SR through the default SR resource or the additional SR resource to the base station, receiving, by the user equipment, an uplink resource allocation information which is determined according to the resource in which the SR is transmitted from the base station, and transmitting, by the user equipment, the uplink data to the base station through a physical uplink shared channel (PUSCH) resource which is allocated by the uplink resource allocation information.

Preferably, the SR may be transmitted to the base station through the additional SR resource, if the uplink data size is a same or smaller than the buffer size.

Preferably, the additional SR resource configuration information may be transmitted through an radio resource control (RRC) connection setup message or an RRC connection reconfiguration message.

Preferably, the user equipment may request the additional SR resource and a size of the buffer which is configured in the additional SR resource.

Preferable, the additional SR resource and the size of the buffer which is configured in the additional SR resource may be requested through an RRC connection setup complete message or a UE capability information message.

Preferable, a size of the PUSCH resource which is allocated by the uplink resource allocation information may be determined based on the buffer size.

Preferable, the additional SR resource configuration information may include at least one of PUCCH resource index information for each multiple SR types or an SR subframe offset information.

Preferable, at least one of a physical uplink control channel (PUCCH) resource index for transmitting the SR, an SR periodicity or an SR subframe offset may be differently configured to the default SR resource and the additional SR resource.

Preferably, a soft buffer size configured by the base station may be determined based on the buffer size configured to the additional SR resource.

Preferable, the SR may be transmitted to the base station through the default SR resource, if an SR for a buffer status report (BSR) transmission is transmitted.

Preferably, the user equipment may receive the uplink resource allocation information for the BSR transmission from the base station, and transmit the BSR to the base station through the PUSCH resource which is allocated by the uplink resource allocation information for the BSR transmission According to embodiments of the present invention, by newly defining the contention-based radio resource region, the latency generated from an application which is sensitive to delay or generated when intermittently transmitting data of small size can be minimized.

In addition, according to embodiments of the present invention, by newly defining the scheduling request signal, the uplink data generated from an application which is sensitive to the latency or that of small size can be smoothly transmitted intermittently.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 illustrates the configurations of a control plane and a user plane of a radio interface protocol between the E-UTRAN and a UE in the wireless communication system to which the present invention can be applied.

FIG. 14 and FIG. 15 illustrate the sub-header of the MAC PDU in the wireless communication system to which the present invention can be applied.

FIG. 18 illustrates a UL resource allocation procedure of a UE in the wireless communication system to which the present application can be applied.

MODE FOR INVENTION

Figure 1:
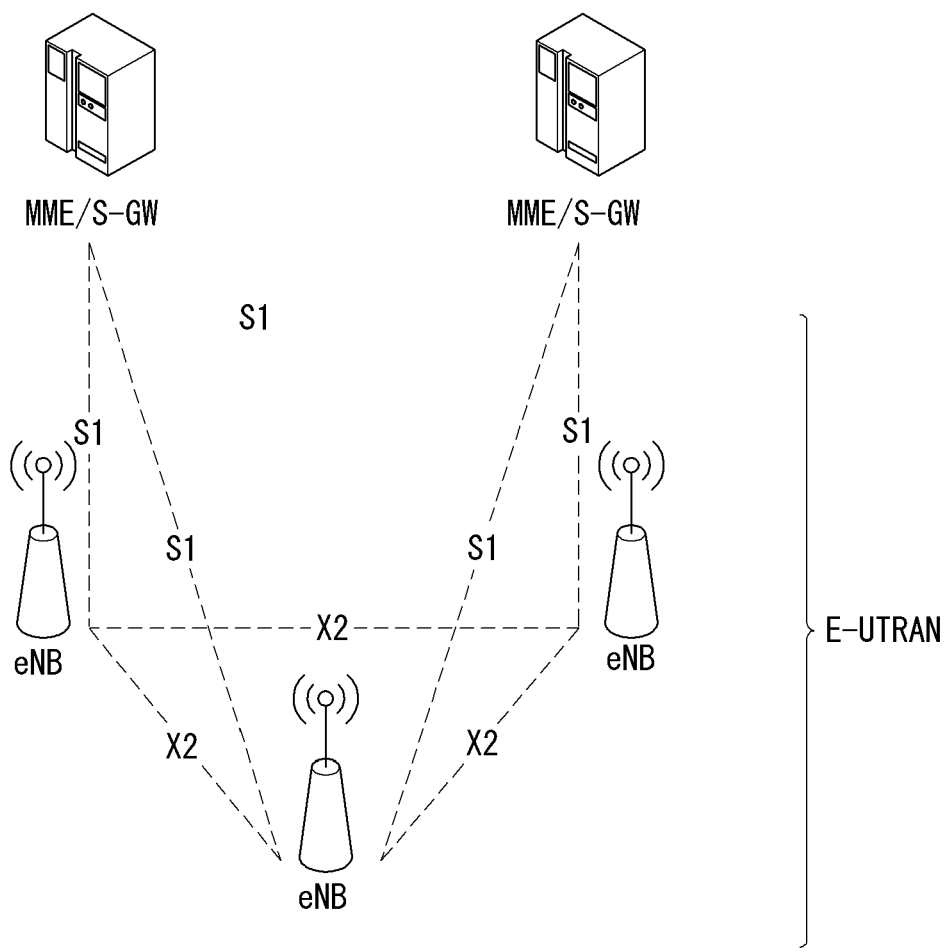
FIG. 1 illustrates a schematic structure a network structure of an evolved universal mobile telecommunication system (E-UMTS) to which the present invention can be applied.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

Figure 3:
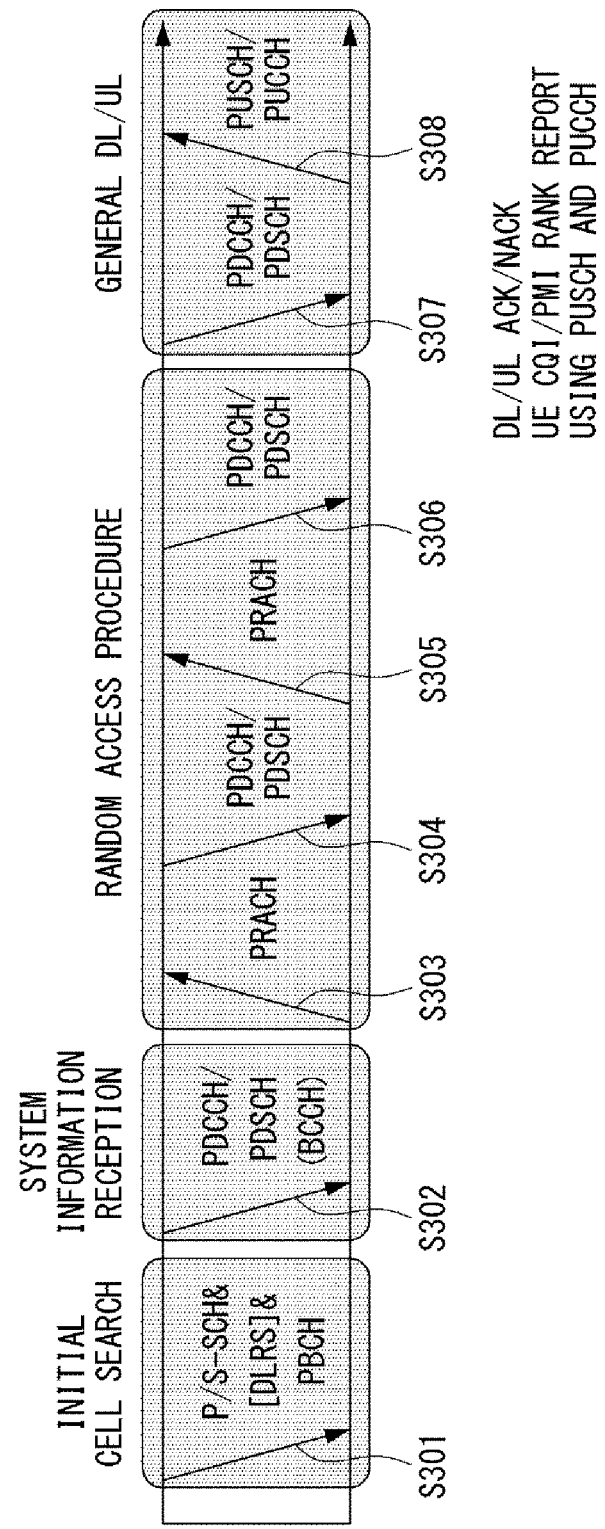
FIG. 3 illustrates physical channels and a view showing physical channels used for in the 3GPP LTE/LTE-A system to which the present invention can be applied.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

Figure 4:
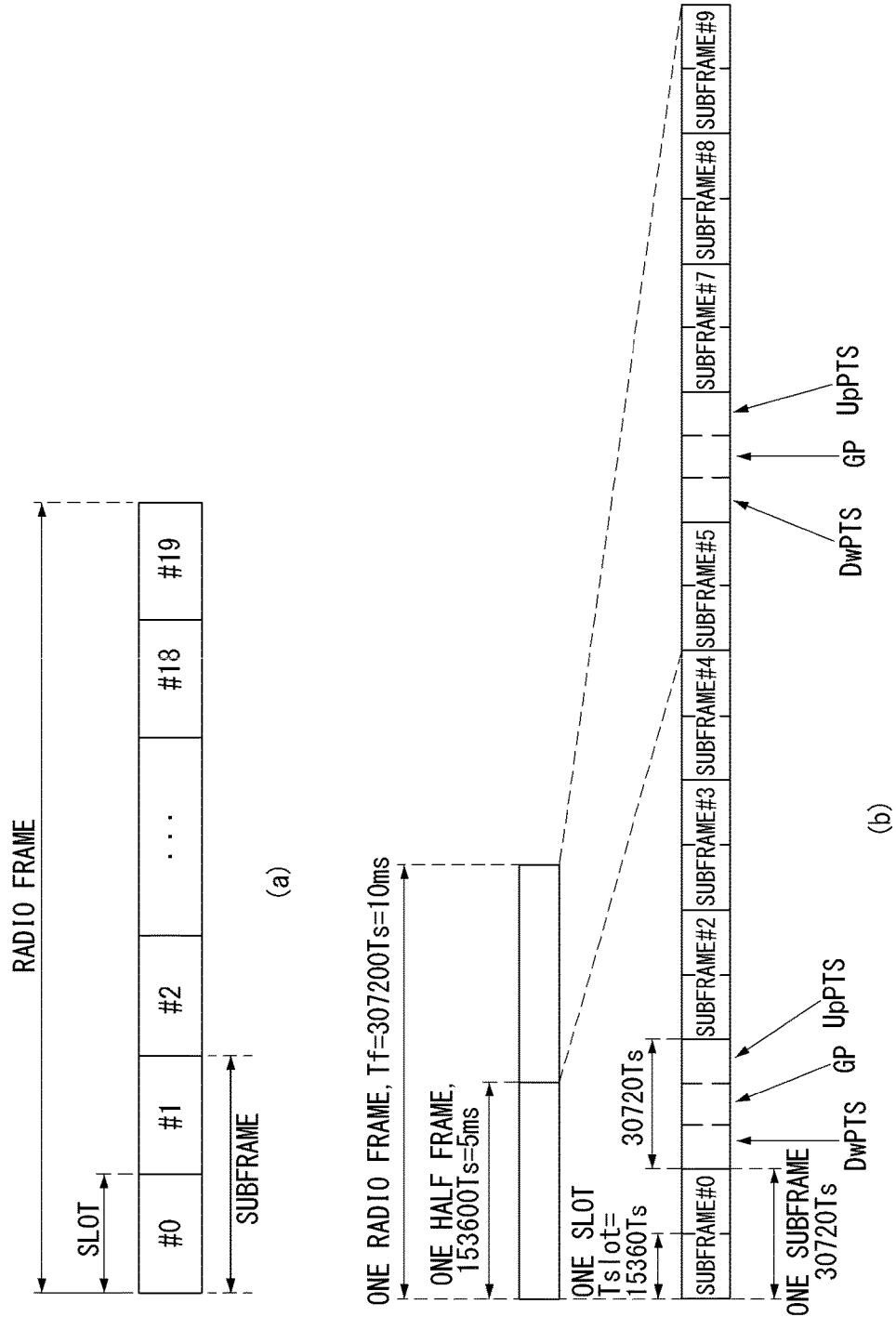
FIG. 4 is a diagram showing the structure of a radio frame used in a 3GPP LTE system to which the present invention can be applied.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0. 5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

Figure 5:
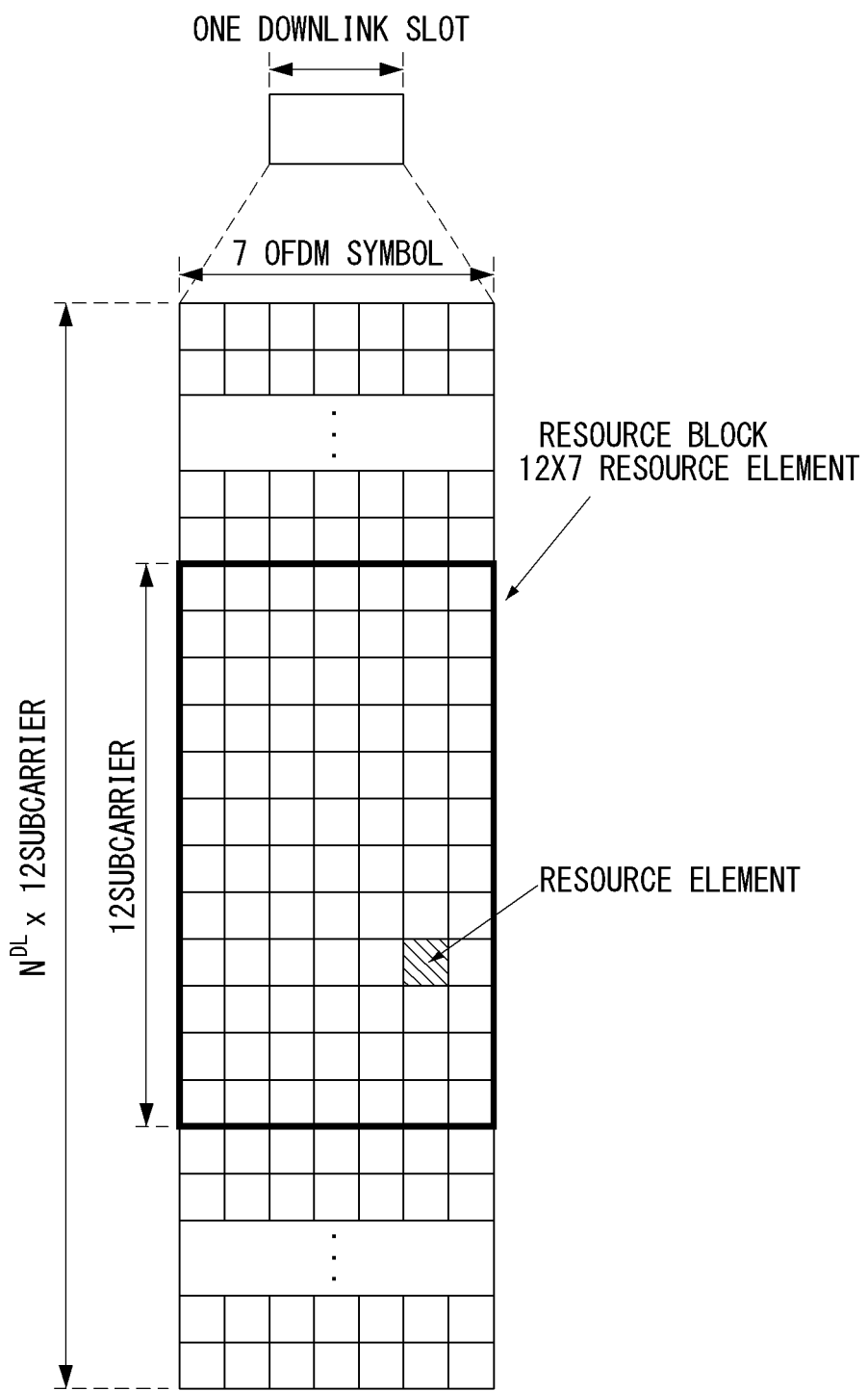
FIG. 5 shows an example of a resource grid for one downlink slot in the wireless communication system to which the present invention can be applied.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , NRB×12-1) denotes an index of subcarrier in the frequency domain, and l(l=0, . . . , 6) denotes an index of symbol in the time domain. The number NDL of resource blocks included in the downlink slot depends on a downlink transmission bandwidth determined in a cell.

Figure 6:
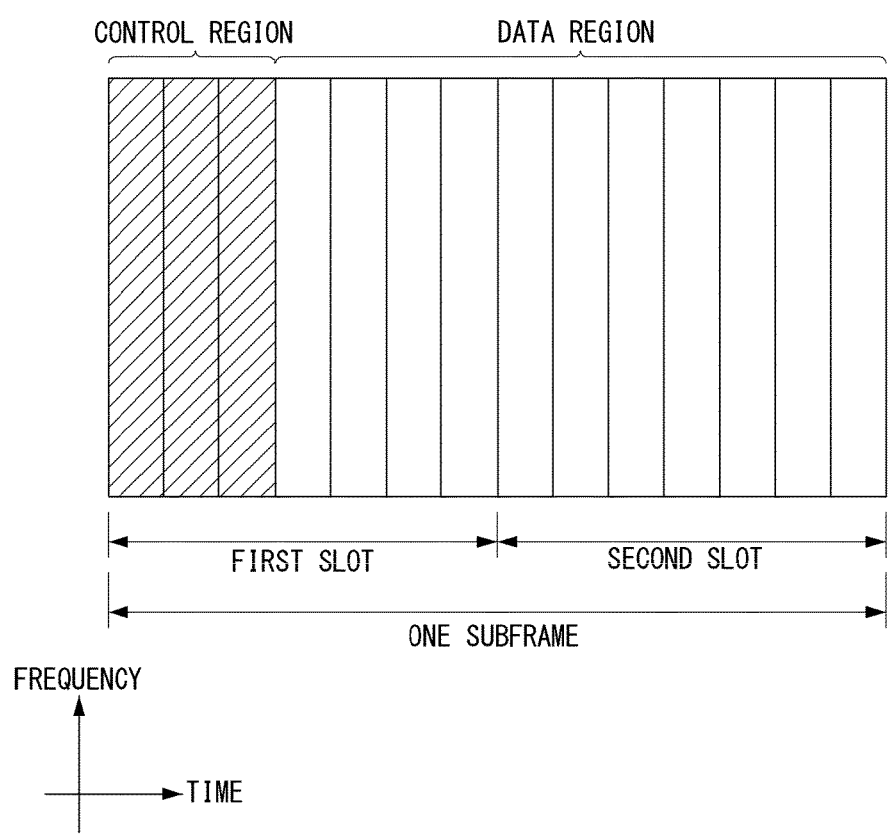
FIG. 6 shows a structure of a downlink subframe in the wireless communication system to which the present invention can be applied.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

Figure 7:
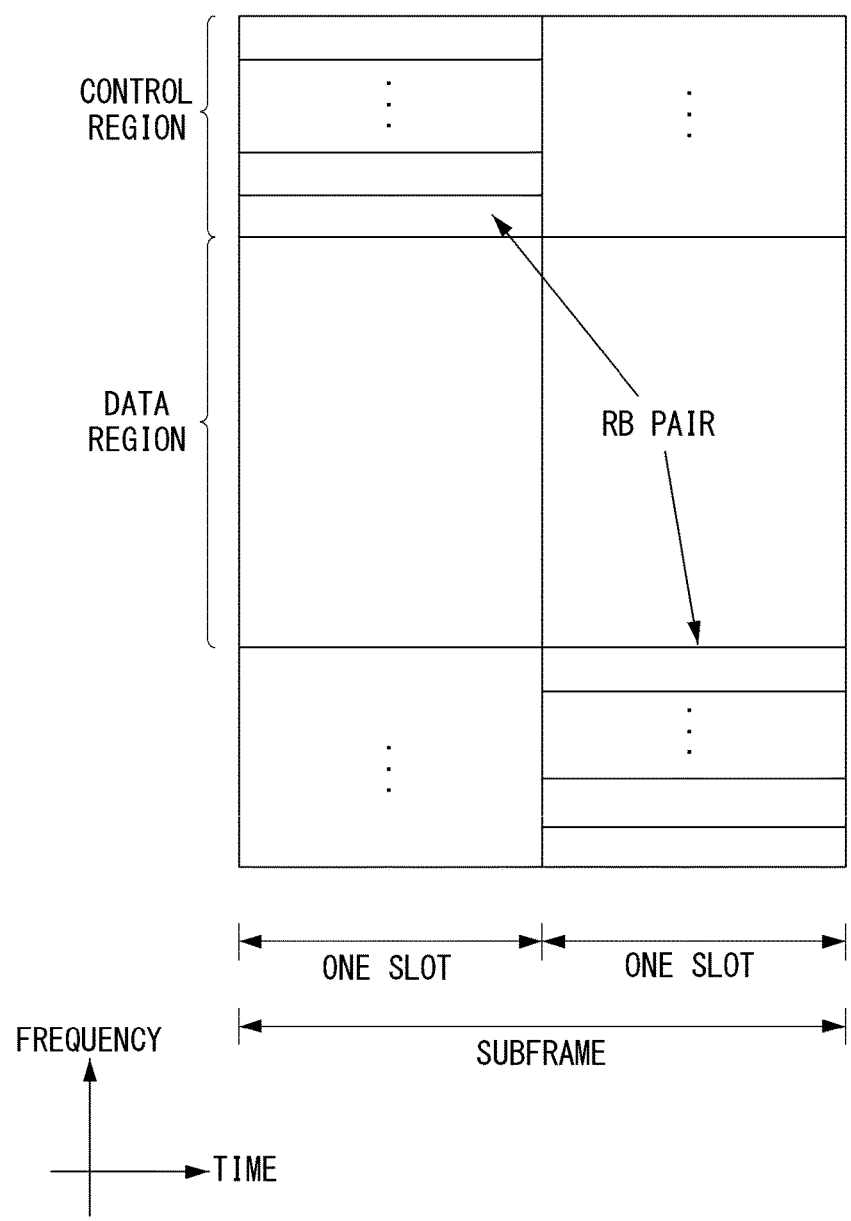
FIG. 7 shows a structure of an uplink subframe in the wireless communication system to which the present invention can be applied.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Hereinafter, the information transmitted through DCI format 0 will be described.

Figures 8, 9:
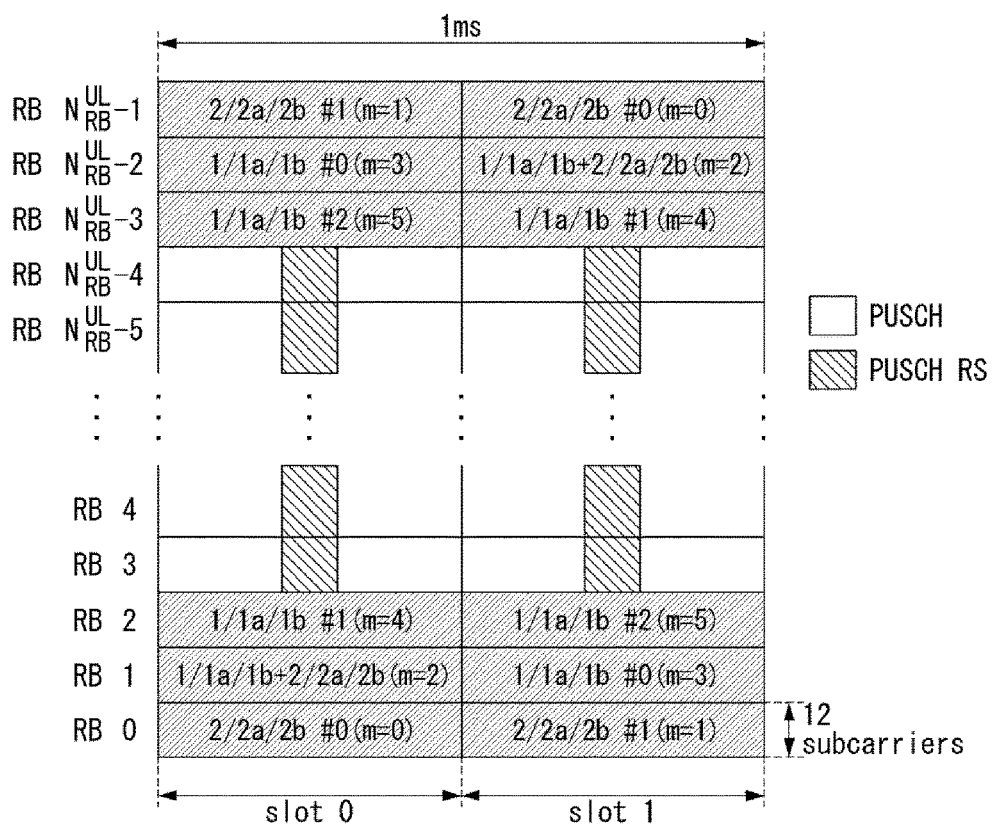
FIG. 8 illustrates a structure of DCI format 0 in the wireless communication system to which the present invention can be applied.
FIG. 9 illustrates an example of a formation that PUCCH formats are mapped to the PUCCH regions of the UL physical resource blocks in the wireless communication system to which the present application can be applied.

FIG. 8 illustrates a structure of DCI format 0 in the wireless communication system to which the present invention can be applied.

DCI format 0 is used for scheduling the PUSCH in one UL cell.

Table 2 represents information transmitted via DCI format 0.

TABLE 2

| Format 0 (Release 8) | Format 0 (Release 10) |
|---|---|
| | Carrier Indicator (CIF) |
| Flag for format 0/format 1A differentiation | Flag for format 0/format 1A differentiation |
| Hopping flag (FH) | Hopping flag (FH) |
| Resource block assignment (RIV) | Resource block assignment (RIV) |
| MCS and RV | MCS and RV |
| NDI (New Data Indicator) | NDI (New Data Indicator) |
| TPC for PUSCH | TPC for PUSCH |
| Cyclic shift for DM RS | Cyclic shift for DM RS |
| UL index (TDD only) | UL index (TDD only) |
| Downlink Assignment Index (DAI) | Downlink Assignment Index (DAI) |
| CSI request (1 bit) | CSI request (1 or 2 bits: 2 bit is for multi carrier) |
| | SRS request |
| | Resource allocation type (RAT) |

Referring to FIG. 8 and Table 2, the information transmitted via DCI format 0 is as follows.

1) Carrier indicator—Includes 0 or 3 bits.

2) Flag for DCI format 0/1A differentiation—Includes 1 bit, a value of 0 indicates DCI format 0 and a value of 1 indicates DCI format 1A.

3) Frequency hopping flag—Includes 1 bit. In this field, a most significant bit (MSB) of resource allocation may be used for multi-cluster allocation.

4) Resource block assignment and hopping resource assignment—Includes $\lceil \log_2(N_{RB}^{DL}(N_{RB}^{DL}+1)/2) \rceil$ bits.

Herein, in case of PUSCH hopping in single-cluster allocation, in order to acquire a value of $\tilde{n}_{PRB}(i)$ NUL_hop MSBs are used. $(\lceil \log_2(N_{RB}^{UL}(N_{RB}^{UL}+1)/2) \rceil) - N_{UL\_hop})$ bits provide resource allocation of a first slot within an uplink subframe. In addition, if PUSCH hopping is not present in single-cluster allocation, $(\lceil \log_2(N_{RB}^{UL}(N_{RB}^{UL}+1)/2) \rceil)$ bits provide resource allocation within an uplink subframe. In addition, if PUSCH hopping is not present in multi-cluster allocation, resource allocation information is obtained from concatenation between the frequency hopping flag field and resource block assignment and hopping resource assignment field and $$\left\lceil \log_2 \left( \binom{\lceil N_{RB}^{UL}/P + 1 \rceil}{4} \right) \right\rceil$$

bits provide resource allocation within an uplink subframe. At this time, the P value is determined by the number of downlink resource blocks.

5) Modulation and coding scheme (MCS)—Includes 5 bits.

6) New data indicator—Includes 1 bit.

7) Transmit power control (TPC) command for PUSCH—Includes 2 bits.

8) Index of orthogonal cover/orthogonal cover code (OC/OCC) and cyclic shift for demodulation reference signal (DMRS)—Includes 3 bits.

9) Uplink Index—Includes 2 bits. This field is present only in TDD operation according to uplink-downlink configuration 0.

10) Downlink assignment index (DAI)—Includes 2 bits. This field is present only in TDD operation according to uplink-downlink configurations 1 to 6.

11) Channel state information (CSI) request—Includes 1 or 2 bits. Herein, a 2-bit field is only applied to the case in which the DCI is mapped to the UE, for which one or more downlink cells are configured, by the C-RNTI in a UE-specific manner.

12) Sounding reference signal (SRS) request—Includes 0 or 1 bit. This field is present only in the case in which a scheduled PUSCH is mapped in a UE-specific manner by the C-RNTI.

13) Multi-cluster flag—Includes 1 bit.

If the number of information bits in DCI format 0 is less than the payload size (including added padding bits) of DCI format 1A, 0 is appended to DCI format 0 such that the number of information bits becomes equal to the payload size of DCI format 1A.

PUCCH

The PUCCH carries various sorts of uplink control information (UCI) according to format as follows.

SR (Scheduling Request): This is information used for requesting the UL-SCH resource. This information is transmitted using an on-off keying (OOK) method.

HARQ ACK/NACK: This is a response signal for DL data packet on a PDSCH. This information represents whether the DL data packet is successfully received. One bit of ACK/NACK is transmitted in response to a single DL codeword and two bits of ACK/NACK are transmitted in response to two DL codewords.

CSI (Channel State Information): This is feedback information for a DL channel. The CSI may include at least one of a channel quality indicator (CQI), a rank indicator (RI), a precoding matrix indicator (PMI) and a precoding type indicator (PTI). Hereinafter, this will be referred to 'CQI' as a common term for the convenience of description.

The PUCCH may be modulated by using a binary phase shift keying (BPSK) technique and a quadrature phase shift keying (QPSK) technique. Control information for a plurality of UEs may be transmitted through the PDCCH. In case of performing code division multiplexing (CDM) to distinguish signal of each of the UEs, constant amplitude zero autocorrelation (CAZAC) sequence is mostly used. Since the CAZAC sequence has characteristics of maintaining a fixed amplitude in a time domain and a frequency domain, the CAZAC has characteristics proper to increase coverage by lowering a peak-to-average power ratio (PAPR) or a cubic metric (CM) of a UE. In addition, the ACK/NACK information for DL data transmission transmitted through the PDCCH is covered by using an orthogonal sequence or an orthogonal cover (OC).

Additionally, control information transmitted on the PUCCH may be distinguished by using a cyclically shifted sequence that has different cyclic shift (CS) values. The cyclically shifted sequence may be generated by shifting cyclically a base sequence by as much as a predetermined cyclic shift amount. The cyclic shift amount is indicated by a CS index. The number of available cyclic shift may be changed according to delay spread of a channel. Various sorts of sequence may be used as the basic sequence, and the CAZAC sequence described above is an example.

In addition, the quantity of control information that can be transmitted by a UE in a subframe may be determined depending on the number of SC-FDMA symbols (i.e., signifies SC-FDMA symbols other than SC-FDMA symbols used for reference signal (RS) transmission for detecting coherent detection of the PUCCH, but except for the last SC-FDMA symbol in a subframe in which a sounding reference signal (SRS) is configured).

The PUCCH may be defined by seven sorts of different formats depending on the control information, a modulation technique, a quantity of the control information, etc. which is transmitted, and the property of uplink control information (UCI) transmitted according to each of the PUCCH formats may be summarized as Table 1 below.

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

Referring to Table 3, PUCCH format 1 is used for a single transmission of a scheduling request (SR). Wave forms which are not modulated are applied to the single transmission of SR, and this will be described below in detail.

PUCCH format 1a or 1b is used for transmitting HARQ acknowledgement/non-acknowledgement (ACK/NACK). When the HARQ ACK/NACK is solely transmitted in an arbitrary subframe, PUCCH format 1a or 1b may be used. Or, the HARQ ACK/NACK and the SR may be transmitted in a same subframe by using PUCCH format 1a or 1b.

PUCCH format 2 is used for transmitting the CQI, and PUCCH format 2a or 2b is used for transmitting the CQI and the HARQ ACK/NACK. In case of an extended CP, PUCCH format 2 may also be used for transmitting the CQI and the HARQ ACK/NACK.

PUCCH format 3 is used for carrying an encoded UCI of 48 bits. PUCCH format 3 may carry the HARQ ACK/NACK for a plurality of serving cells, the SR (if existed) and the CSI report for a serving cell.

FIG. 9 illustrates an example of a formation that PUCCH formats are mapped to the PUCCH regions of the UL physical resource blocks in the wireless communication system to which the present application can be applied.

A PUCCH for a UE is allocated to an RB pair in a subframe. The RBs belonging to the RB pair occupy different subcarriers in each of a first slot and a second slot. A frequency occupied by RBs belonged in the RB pair allocated to the PUCCH is changed based on a slot boundary. This is expressed that the RB pair allocated to the PUCCH is frequency-hopped in the slot boundary. A UE transmits UL control information through different subcarriers according to time, thereby obtaining a frequency diversity gain.

In FIG. 9, $N_{RB}^{UL}$ represents the number of resource block in UL, and 0, 1, . . . , $N_{RB}^{UL}-1$ signifies given number of the physical resource block. Basically, the PUCCH is mapped to both edges of the UL frequency blocks. As shown in FIG. 9, PUCCH formats 2/2a/2b are mapped to the respective PUCCH regions marked by m=0 and 1, and this may be represented as PUCCH formats 2/2a/2b are mapped to the resource blocks located at band edges. In addition, PUCCH formats 2/2a/2b and PUCCH formats 1/1a/1b are mixedly mapped to the PUCCH region marked by m=2. Next, PUCCH formats 1/1a/1b may be mapped to the PUCCH regions marked by m=3, 4 and 5. The number $N_{RB}^{(2)}$ of PUCCH RBs usable by PUCCH formats 2/2a/2b may be indicated by the UEs within a cell by broadcasting signaling.

Table 4 represents modulation schemes according to the PUCCH format and number of bits per subframe. In Table 4, PUCCH formats 2a and 2b correspond to the case of normal cyclic shift.

TABLE 4

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Table 5 represents the number of symbols of PUCCH demodulation reference signal per slot according to the PUCCH format.

TABLE 5

| PUCCH format | Normal cyclic prefix | Extended cyclic prefix |
| --- | --- | --- |
| 1, 1a, 1b | 3 | 2 |
| 2, 3 | 2 | 1 |
| 2a, 2b | 2 | N/A |

Table 6 represents SC-FDMA symbol location of the PUCCH demodulation reference signal according to the PUCH format. In Table 6, l represents a symbol index.

TABLE 6

| | Set of values for l | |
| --- | --- | --- |
| PUCCH format | Normal cyclic prefix | Extended cyclic prefix |
| 1, 1a, 1b | 2, 3, 4 | 2, 3 |
| 2, 3 | 1, 5 | 3 |
| 2a, 2b | 1, 5 | N/A |

Hereinafter, PUCCH formats 2/2a/2b will be described.

PUCCH formats 2/2a/2b are used for CQI feedback (or ACK/NACK transmission together with the CQI feedback) for DL transmission. In order for the CQI to be transmitted with the ACK/NACK may be transmitted with being embedded in the CQI RS (in case of a normal CP), or transmitted with the CQI and the ACK/NACK being joint coded (in case of an extended CP).

Figure 10:
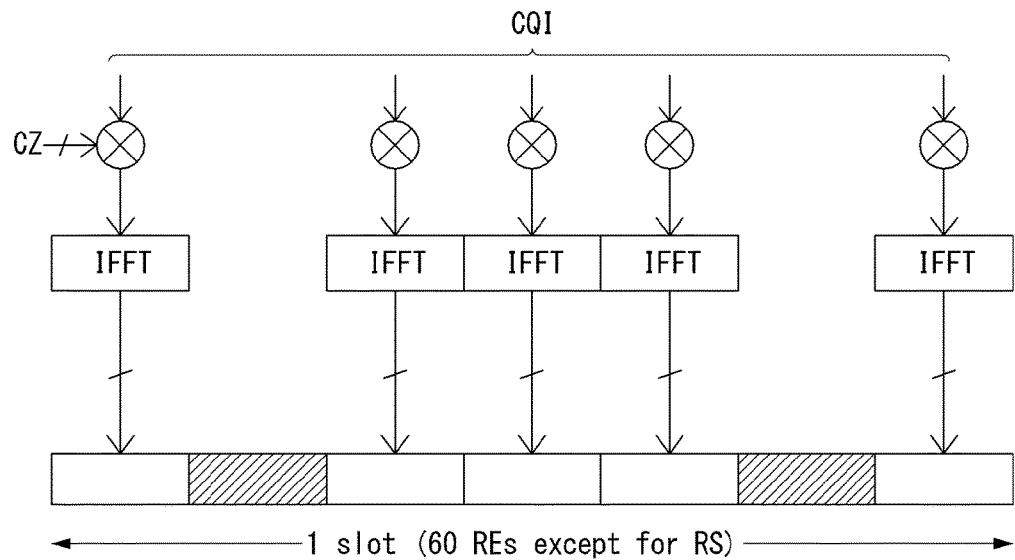
FIG. 10 shows a structure of CQI channel in case of a normal CP in the wireless communication system to which the present invention can be applied.

FIG. 10 shows a structure of CQI channel in case of a normal CP in the wireless communication system to which the present invention can be applied.

Among SC-FDMA symbols 0 to 6 in a slot, SC-FDMA symbols 1 to 5 (a second and a sixth symbols) are used for transmitting demodulation reference signal (DMRS), and the CQI information may be transmitted in the remainder SC-FDMA symbols. Meanwhile, in case of the extended CP, one SC-FDMA symbol (SC-FDMA symbol 3) is used for transmitting the DMRS.

In PUCCH formats 2/2a/2b, the modulation by the CAZAC sequence is supported, and the QPSK modulated symbol is multiplied by the CAZAC sequence of length 12. The cyclic shift (CS) of sequence may be changed between symbols and slots. An orthogonal covering is used for the DMRS.

In two SC-FDMA symbols which are three SC-FDMA symbol intervals from seven SC-FDMA symbols included in a slot, the reference signal (DMRS) is carried, and in the remainder five SC-FDMA symbols, the CQI information is carried. In order to support a high speed UE, two RSs are used in a slot. In addition, the respective UEs are distinguished by using the cyclic shift (CS) sequence. The CQI information symbols are transmitted with being modulated to whole SC-FDMA symbol, and the SC-FDMA symbol includes one sequence. That is, the UE transmits the CQI with being modulated to each sequence.

The number of symbols which may be transmitted to one TTI is 10, and the modulation of the CQI information is also defined to the QPSK. Front five symbols are transmitted in a first slot, and the remainder five symbols are transmitted in a second slot. Since the CQI value of 2 bits may be carried in case of using the QPSK mapping for the SC-FDMA symbol, the CQI value of 10 bits may be carried in one slot. Accordingly, the CQI value of maximum 20 bits may be carried in one subframe. In order to spread the CQI information in a frequency domain, a frequency domain spread code is used.

As the frequency domain spread code, the CAZAC sequence of length 12 (e.g., ZC sequence) may be used. Each control channel may be distinguished by applying the CAZAC sequence that has different cyclic shift values. An inverse fast Fourier transform is performed for the CQI information which is spread in the frequency domain.

By the cyclic shifts that have twelve equivalent intervals, twelve different UEs may be orthogonally multiplexed on the same PUCCH RB. In case of a normal CP, the DMRS sequence on SC-FDMA symbol 1 and 5 (on SC-FDMA symbol 3 in case of an extended CP) is similar to the CQI signal sequence on the frequency domain, but the modulation similar to that of the CQI information is not applied.

A UE may be semi-statically configured to report different CQI, PMI and RI types periodically on the PUCCH resources indicated by the PUCCH resource indexes $n_{PUCCH}^{(1,\tilde{p})}$, $n_{PUCCH}^{(2,\tilde{p})}$, $n_{PUCCH}^{(3,\tilde{p})}$ by a higher layer signaling. Herein, the PUCCH resource index $n_{PUCCH}^{(2,\tilde{p})}$ is information that indicates the PUCCH region used for transmitting PUCCH formats 2/2a/2b and cyclic shift (CS) to be used.

Table 7 represents an orthogonal sequence (OC) [ $\overline{w}^{(\tilde{p})}(0)/\wedge\overline{w}^{(\tilde{p})}(N_{RS}^{PUCCH}-1)$] for RS in PUCCH formats 2/2a/2b/3.

TABLE 7

| Normal cyclic prefix | Extended cyclic prefix |
| --- | --- |
| [1 1] | [1] |

Next, PUCCH formats 1/1a/1b will be described below.

Figure 11:
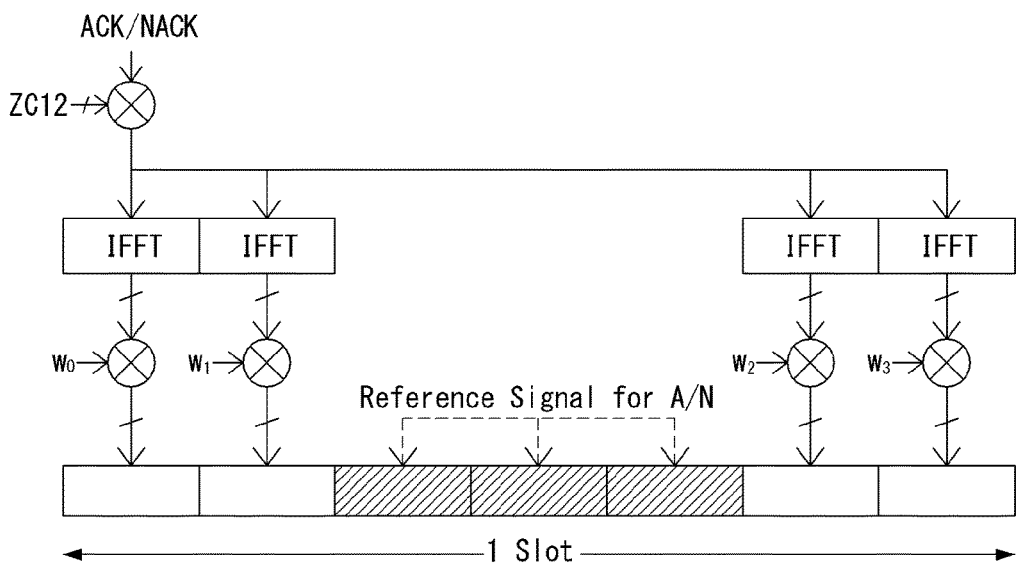
FIG. 11 shows a structure of ACK/NACK in case of a normal CP in the wireless communication system to which the present invention can be applied.

FIG. 11 shows a structure of ACK/NACK in case of a normal CP in the wireless communication system to which the present invention can be applied.

A confirmation response information (in a state of not scrambled) of 1 bit or 2 bits may be represented as a HARQ ACK/NACK modulation symbol using the BPSK and QPSK modulation techniques, respectively. An affirmative confirmation response (ACK) may be encoded as '1', and a negative confirmation response (NACK) may be encoded as '0'.

When transmitting a control signal in an allocated bandwidth, two dimensional spread is applied in order to increase a multiplexing capacity. That is, a spread in frequency domain and a spread in time domain are simultaneously applied in order to increase the number of UE or the number of control channel that can be multiplexed.

In order to spread an ACK/NACK signal in frequency domain, a frequency domain sequence is used as a basic sequence. As the frequency domain sequence, Zadoff-Chu (ZC) sequence which is one of constant amplitude zero autocorrelation waveform sequences may be used.

That is, in PUCCH format 1a/1b, the symbol modulated using the BPSK or the QPSK modulation scheme is multiplied by the CAZAC sequence (e.g., the ZC sequence) of length 12. For example, the result of the CAZAC sequence r(n) (n=0, 1, 2, . . . , N−1) of length N modulated to modulation symbol d(0) is y(0), y(1), y(2), . . . , y(N−1). The symbols y(0), y(1), y(2), . . . , y(N−1) may be referred to as block of symbols.

Like this, different cyclic shifts (CS) are applied to the Zadoff Chu (ZC) sequence which is a basic sequence, and multiplexing of different UEs or different control channels may be applied. The number of CS resources supported by SC-FDMA symbol which is for PUCCH RBs in the HARQ ACK/NACK transmission is setup by a cell-specific higher layer signaling parameter ($\Delta_{shift}^{PUCCH}$).

After multiplying the CAZAC sequence to the modulation symbol, the block-wise spread using an orthogonal sequence is applied. That is, the ACK/NACK signal spread in a frequency domain is spread in a time domain by using an orthogonal spreading code. As for the orthogonal spreading code (or the orthogonal cover sequence or an orthogonal cover code (OCC)), a Walsh-Hadamard sequence or a Discrete Fourier Transform (DFT) sequence may be used. For example, the ACK/NACK signal may be spread by using the orthogonal sequence (w0, w1, w2, w3) of length 4 for four symbols. In addition, an RS is also spread through the orthogonal sequence of length 3 or length 2. This is referred to as an orthogonal covering (OC).

As for the CDM of ACK/NACK information or demodulation reference signal, an orthogonal covering such as a Walsh code, a DFT matrix, etc. may be used.

The DFT matrix is comprised of square matrixes, and constructed as a size of N×N (N is a natural number).

The DFT matrix may be defined as Equation 1.

$$W = \left( \frac{\omega^{jk}}{\sqrt{N}} \right)_{j,k=0,\ldots,N-1}$$ [Equation 1]

Also, the DFT matrix may be represented as a matrix of Equation 2 below which is equivalent to Equation 1.

$$W = \frac{1}{\sqrt{N}} \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \ldots & \omega^{(N-1)(N-1)} \end{bmatrix},$$

In Equation 2, $$\omega = e^{-\frac{2\pi i}{N}}$$

signifies a primitive $N^{th}$ root of unity.

The DFT matrix of 2 points, 4 points and 8 points correspond to Equations 3, 4 and 5 below.

$$\frac{1}{\sqrt{2}} \begin{bmatrix} 1 & 1 \\ 1 & -1 \end{bmatrix}$$ [Equation 3]

$$W = \frac{1}{\sqrt{4}} \begin{bmatrix} 1 & 1 & 1 & 1 \\ 1 & -i & -1 & i \\ 1 & -1 & 1 & -1 \\ 1 & i & -1 & -i \end{bmatrix}$$ [Equation 4]

$$W = \frac{1}{\sqrt{8}} \begin{bmatrix} \omega^0 & \omega^0 & \omega^0 & \ldots & \omega^0 \\ \omega^0 & \omega^1 & \omega^2 & \ldots & \omega^7 \\ \omega^0 & \omega^2 & \omega^4 & \ldots & \omega^{14} \\ \omega^0 & \omega^3 & \omega^6 & \ldots & \omega^{21} \\ \omega^0 & \omega^4 & \omega^8 & \ldots & \omega^{28} \\ \omega^0 & \omega^5 & \omega^{10} & \ldots & \omega^{35} \\ \vdots & \vdots & \vdots & \ddots & \vdots \\ \omega^0 & \omega^7 & \omega^{14} & \ldots & \omega^{49} \end{bmatrix}$$ [Equation 5]

In case of a normal CP, in SC-FDMA symbols that are series of 3 middle parts out of 7 SC-FDMA symbols included in a slot, the reference signal (RS) is carried, and in the rest 4 SC-FDMA symbols, the ACK/NACK signal is carried. Meanwhile, in case of an extended CP, the RS may be carried in two consecutive symbols of the middle parts. The number and location of symbols used for the RS may be changed according to a control channel, and the number and location of symbols used for the ACK/NACK signal related may be changed according to the control channel as well.

For normal ACK/NACK information, the Walsh-Hadamard sequence having length 4 is used, and for shortened ACK/NACK information and the reference signal, a DFT of length 3 is used.

For the reference signal of an extended CP case, the Walsh-Hadamard sequence having length 2 is used.

Table 8 represents an orthogonal sequence of length 4 [w(0) . . . w($N_{SF}^{PUCCH}$−1)] for PUCCH format 1a/1b.

TABLE 8

| Sequence index $n_{oc}^{(\tilde{p})}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

Table 9 represents an orthogonal sequence of length 3 $[w(0) \ldots w(N_{SF}^{PUCCH}-1)]$ for PUCCH format 1a/1b.

TABLE 9

| Sequence index $n_{oc}^{(\tilde{p})}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Table 10 represents an orthogonal sequence $[\bar{w}^{(\tilde{p})}(0) \ldots \bar{w}^{(\tilde{p})}(N_{RS}^{PUCCH}-1)]$ for the RS in PUCCH format 1/1a/1b.

| Sequence index $\bar{n}_{oc}^{(\tilde{p})}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

As described above, by using the CS resource in the frequency domain and the OC resource in the time domain, numerous UEs may be multiplexed in a code division multiplexing (CDM) method. That is, the ACK/NACK information and the RS of a great number of UEs may be multiplexed on the same PUCCH RB.

For the time domain spreading CDM like this, the number of extended codes that are supported for the ACK/NACK information is limited by the number of RS symbols. That is, since the number of SC-FDMA symbols in the RS transmission is less than the number of SC-FDMA symbols in the ACK/NACK information transmission, the multiplexing capacity of RS is smaller than the multiplexing capacity of ACK/NACK information.

For example, in case of a normal CP, the ACK/NACK information may be transmitted in four symbols. In case of an extended CP, three orthogonal spreading codes, not four, may be used. This is because the number of RS transmission symbols is limited to three, and three orthogonal spreading codes only may be used for the RS.

In case that three symbols in one slot are used for the RS transmission and four symbols are used for the ACK/NACK information transmission in the subframe of a normal CP, for example, if six cyclic shifts (CSs) can be used in the frequency domain and three orthogonal covering (OC) resources can be used in the time domain, the HARQ confirmation response from total 18 different UEs may be multiplexed in one PUCCH RB. If two symbols in one slot of a subframe of the extended CP are used for the RS transmission and four symbols are used for the ACK/NACK information transmission, for example, if six cyclic shifts (CSs) can be used in the frequency domain and two orthogonal covering (OC) resources can be used in the time domain, the HARQ confirmation response from total 12 different UEs may be multiplexed in the PUCCH RB.

Subsequently, PUCCH format 1 will be described. The schedule request (SR) is transmitted in a way of a UE being requested to be scheduled or a way of not being requested. The SR channel reuses the ACK/NACK channel structure in PUCCH format 1a/1b, and is configured in on-off keying (OOK) method based on an ACK/NACK channel design. In the SR, the reference signal is not transmitted. Accordingly, in the normal CP, the sequence of length 7 is used, and in the extended CP, the sequence of length 6 is used. For the SR and the ACK/NACK, different cyclic shifts or orthogonal covers may be allocated.

Figure 12:
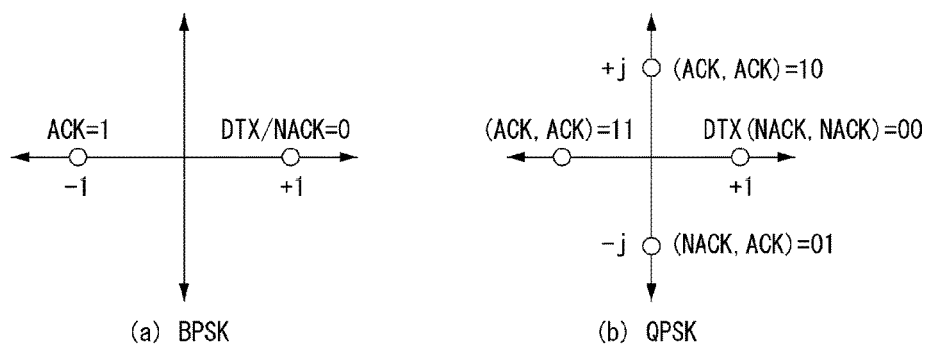
FIG. 12 illustrates a method for multiplexing the ACK/NACK and the SR in the wireless communication system to which the present invention can be applied.

FIG. 12 illustrates a method for multiplexing the ACK/NACK and the SR in the wireless communication system to which the present invention can be applied.

The structure of SR PUCCH format 1 is identical to the structure of ACK/NACK PUCCH format 1a/1b illustrated in FIG. 12.

The SR is transmitted by using the on-off keying (KOO) method. Particularly, the UE transmits the SR having a modulation symbol d(0)=1 to request the PUSCH resource (a positive SR), and in case of not requesting the scheduling (a negative SR), nothing is transmitted. As the PUCCH structure for the ACK/NACK is reused for the SR, different PUCCH resource index (that is, a combination of different CS and orthogonal code) within a same PUCCH region may be allocated to the SR (PUCCH format 1) or to the HARQ ACK/NACK (PUCCH format 1a/1b). The PUCCH resource index that is going to be used by the UE for the SR transmission may be set by the UE-specific higher layer signaling.

In case that the UE is required to transmit the positive SR in the subframe in which the CQI transmission is scheduled, CQI is dropped and the SR only may be transmitted. Similarly, if a case is occurred that the SR and the SRS should be transmitted at the same time, the UE drops the CQI rather may transmit the SR only.

In case that the SR and the ACK/NACK are occurred in the same subframe, the UE transmits the ACK/NACK on the SR PUCCH resource that is allocated for the positive SR. In the meantime, in case of the negative SR, the UE transmits the ACK/NACK on the allocated ACK/NACK resource.

FIG. 12 illustrates a property mapping for the simultaneous transmission of the ACK/NACK and the SR. In particular, it illustrates that the NACK (or, in case of 2 MIMO codewords, NACK, NACK) is modulated to map to +1. Accordingly, it is processed as NACK when a discontinuous transmission (DTX) is occurred.

For the SR and persistent scheduling, the ACK/NACK resource consisting of a CS, an OC, and a physical resource block (PRB) may be allocated to the UE through the radio resource control (RRC). Meanwhile, for the dynamic ACK/NACK transmission and non-persistent scheduling, the ACK/NACK resource may be allocated to the UE implicitly through the lowest CCE index of the PDCCH corresponding to the PDSCH.

In case of requiring resources for the UL data transmission, the UE may transmit the SR. That is, the SR transmission is triggered by an event.

The SR PUCCH resource is configured by a higher layer signaling except a case that the SR is transmitted with the HARQ ACK/NACK by using PUCCH format 3. That is, it is configured by a SchedulingRequestConfig information element that is transmitted through the radio resource control (RRC) message (for example, RRC connection reconfiguration message).

Table 11 exemplifies the SchedulingRequestConfig information element.

TABLE 11

```
-- ASN1START
SchedulingRequestConfig ::=   CHOICE {
    release                   NULL,
    setup                     SEQUENCE {
        sr-PUCCH-ResourceIndex        INTEGER (0..2047),
        sr-ConfigIndex                INTEGER (0..157),
        dsr-TransMax                  ENUMERATED {
                                      n4, n8, n16, n32, n64, spare3, spare2, spare1}
    }
}
SchedulingRequestConfig-v1020 ::=   SEQUENCE {
    sr-PUCCH-ResourceIndexP1-r10   INTEGER (0..2047)      OPTIONAL    -- Need OR
}
-- ASN1STOP
```

Table 12 represents a field that is included in the SchedulingRequestConfig information element.

TABLE 12

SchedulingRequestConfig field descriptions dsr-TransMax
Parameter for the SR transmission. Value n4 represents 4 transmissions, value n8 represents 8 transmissions, and the rest is the same as above.
sr-ConfigIndex
Parameter($I_{SR}$). Value 156 and 157 are not applied to release 8.
sr-PUCCH-ResourceIndex, sr-PUCCH-ResourceIndexP1
Parameter($n_{PUCCH, SRI}^{(1, p)}$) for the respective antenna port P0 and P1. E-UTRAN is configured the sr-PUCCH-ResourceIndexP1 only in case that the sr-PUCCHResourceIndex is set.

Referring to Table 12, the UE receives sr-PUCCH-ResourceIndex parameter and sr-ConfigIndex parameter ($I_{SR}$) indicating the SR configuration index through the RRC message for the SR transmission. By the sr-ConfigIndex parameter, $SR_{PERIODICITY}$ indicating the periodicity when the SR is transmitted and $N_{OFFSET,SR}$ indicating the subframe where the SR is transmitted may be configured. That is, the SR is transmitted from a specific subframe that is periodically repeated according to $I_{SR}$ that is given by a higher layer. Also, the subframe resource and CDM/frequency division multiplexing (FDM) resource may be allocated to the resource for the SR.

Table 13 represents the SR transmission periodicity according to the SR configuring index and the SR subframe offset.

TABLE 13

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

Buffer Status Reporting (BSR)

Figure 13:
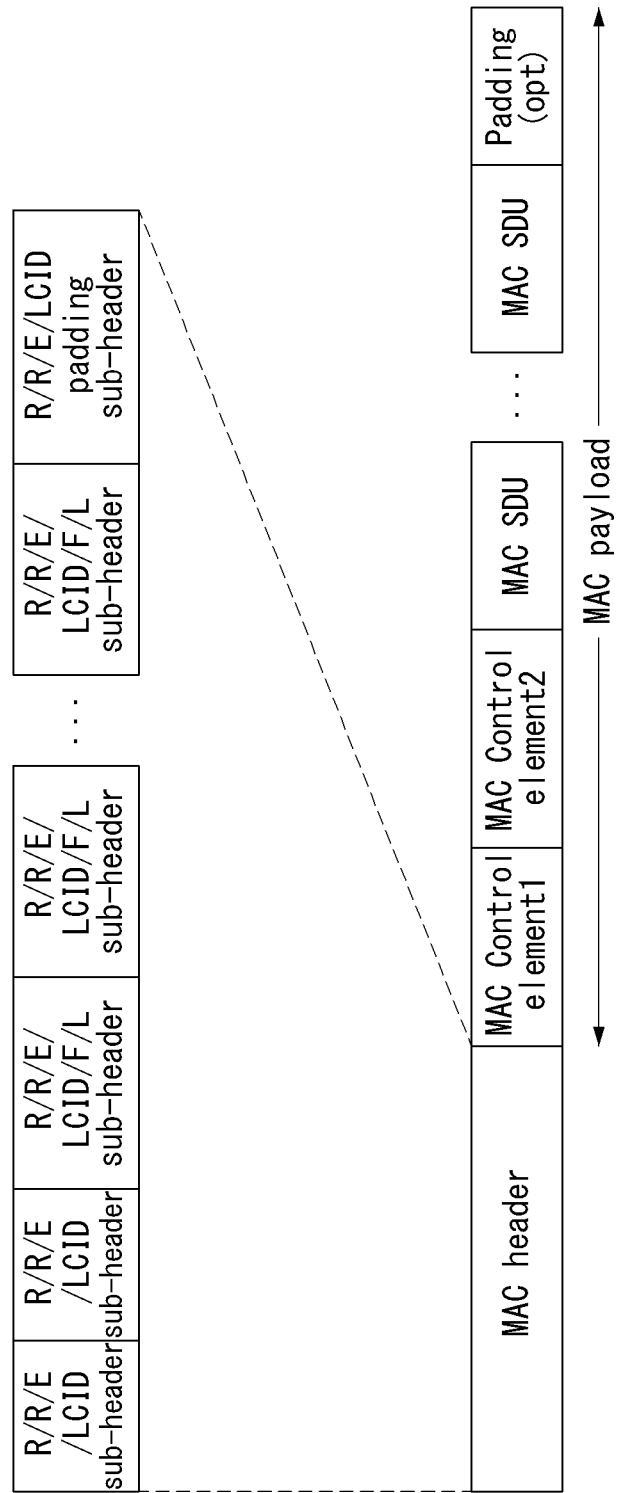
FIG. 13 illustrates the MAC PDU used in the MAC entity in the wireless communication system to which the present invention can be applied.

FIG. 13 illustrates the MAC PDU used in the MAC entity in the wireless communication system to which the present invention can be applied.

Referring to FIG. 13, the MAC PDU includes a MAC header, at least one MAC service data unit (SDU) and at least one control element, additionally may include a padding. In some cases, at least one of the MAC SDUs and the MAC control elements may not be included in the MAC PDU.

As an example of FIG. 13, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 10, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 10, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 10, the sub-header that is included four header fields may be used. In case that the sub-header includes four fields like this, the four fields may be R/R/E/ LCID.

FIG. 14 and FIG. 15 illustrate the sub-header of the MAC PDU in the wireless communication system to which the present invention can be applied.

Each field is described as below with reference to FIG. 14 and FIG. 15.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 14 represents the value of LCID for the DL-SCH

TABLE 14

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 15 represents the value of LCID for the UL-SCH

TABLE 15

| Index | LCID values |
|---|---|
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 14 and Table 15 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 11 (a)), otherwise, the 15-bit L field may be used (FIG. 11 (b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 12.

Figure 16:
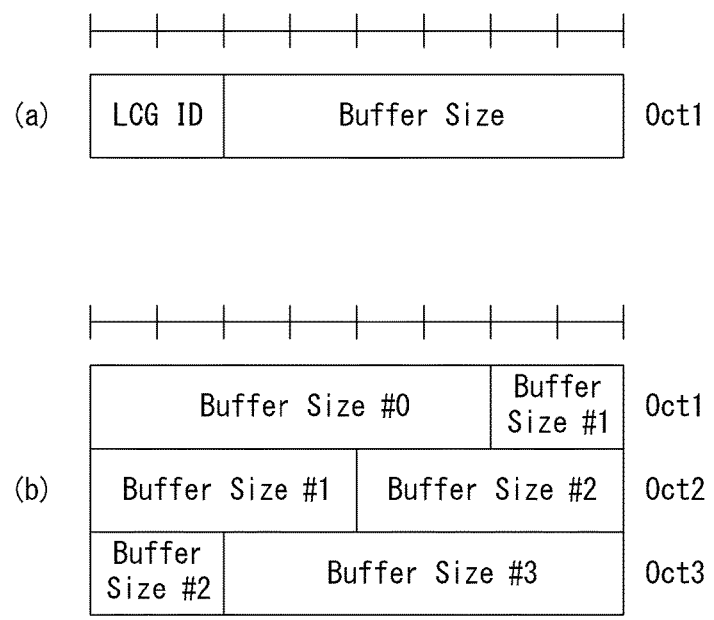
FIG. 16 illustrates formats of the MAC control elements in order to report the buffer state in the wireless communication system to which the present invention can be applied.

FIG. 16 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 16 (a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 16 (b), may include four buffer size fields indicating the buffer state of four groups having 0 to 3 LCG IDs. Each of the buffer size fields may be used for identifying the total amount of available data from different logical channel groups.

Carrier Aggregation

A communication environment considered in the embodiments of the present invention includes all multi-carrier environments. That is, a multi-carrier system or a carrier aggregation (CA) system used in the present invention refers to a system for aggregating and utilizing one or more component carriers having a bandwidth smaller than a target bandwidth, for wideband support.

In the present invention, multi-carrier refers to carrier aggregation. Carrier aggregation includes aggregation of contiguous carriers and aggregation of non-contiguous carriers. In addition, the number of component carriers aggregated in downlink and uplink may be differently set. The case where the number and/or bandwidth of downlink component carriers (DL CCs) and the number and bandwidth of uplink component carriers (UL CCs) are the same is referred to as symmetric aggregation and the case where the number and/or bandwidth of downlink component carriers (DL CCs) and the number and bandwidth of uplink component carriers (UL CCs) are different is asymmetric aggregation. Such carrier aggregation is used interchangeable with the terms "carrier aggregation", "bandwidth aggregation" or "spectrum aggregation".

Carrier aggregation configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system. For example, the existing 3GPP LTE system may support bandwidths of 1.4, 3, 5, 10, 15 and 20 MHz and an LTE_Advanced (LTE_A) system evolved from the LTE system may support a bandwidth greater than 20 MHz using only the bandwidths supported by the LTE system. Alternatively, the carrier aggregation system used in the present invention may define a new bandwidth so as to support CA, regardless of the bandwidths used in the existing system.

The above-described carrier aggregation environment may be called a multiple-cell environment. The cell is defined as a combination of downlink resources (DL CCs) and uplink resources (UL CCs), and the uplink resources are not mandatory. Accordingly, the cell may be composed of downlink resources alone or both downlink resources and uplink resources. If a specific UE has one configured serving cell, the UE may have one DL CC and one UL CC. If a specific UE has two or more configured serving cells, the UE may have DL CCs corresponding in number to the number of cells and the number of UL CCs may be equal to or less than the number of DL CCs, and vice versa. If a specific UE has a plurality of configured service cells, a carrier aggregation environment in which the number of DL CCs is greater than the number of UL CCs may also be supported. That is, carrier aggregation may be regarded as aggregation of two or more cells having different carrier frequencies (center frequencies of a cell). If carrier aggregation is supported, linkage between a carrier frequency (or a DL CC) of downlink resources and a carrier frequency (or a UL CC) of uplink resources may be indicated by system information. The DL CC and the UL CC may be referred to as DL cell and UL cell, respectively. The cell described herein should be distinguished from a "cell" as a general region covered by a BS.

A cell used in the LTE-A system includes a primary cell (PCell) and a secondary cell (SCell). The PCell and the SCell may be used as service cells. In case of a UE which is in an RRC_connected state but does not set carrier aggregation or supports carrier aggregation, only one serving cell composed of a PCell exists. In contrast, in case of a UE which is in an RRC_CONNECTED state and sets carrier aggregation, one or more serving cells exist. The serving cell includes a PCell and one or more SCell.

A serving cell (PCell and SCell) may be set through an RRC parameter. PhyCellId is a physical layer identifier of a cell and has an integer value from 0 to 503. SCellIndex is a short identifier used to identify an SCell and has an integer value from 1 to 7. A value of 0 is applied to the PCell and SCellIndex is previously given to be applied to the Scell. That is, a cell having a smallest cell ID (or a cell index) in ServCellIndex becomes the PCell.

The PCell refers to a cell operating on a primary frequency (e.g., a primary CC (PCC)). The PCell is used to perform an initial connection establishment process or a connection re-establishment process at a UE. The PCell may indicate a cell indicated in a handover process. The PCell refers to a cell for performing control-associated communication among serving cells set in a carrier aggregation environment. That is, a UE may receive a PUCCH allocated by a PCell to which the UE belongs and perform transmission and use only the PCell to acquire system information and change a monitoring procedure. In evolved universal terrestrial radio access (E-UTRAN), a UE supporting a carrier aggregation environment may change only the PCell for a handover procedure using an RRCConnectionReconfiguration message of a higher layer including mobilityControlInfo.

The SCell refers to a cell operating on a secondary frequency (e.g., a secondary CC (SCC)). Only one PCell may be allocated to a specific UE and one or more SCells may be allocated to the specific UE. The SCell may be configured after radio resource control (RRC) connection establishment and may be used to provide additional radio resources. A PUCCH is not present in cells except for the PCell among serving cells set in a carrier aggregation environment, that is, the SCells. E-UTRAN may provide all system information associated with the operation of an associated cell in an RRC_CONNECTED state via a dedicated signal when SCells are added to a UE supporting a carrier aggregation environment. Change of system information may be controlled by release and addition of the SCell. At this time, an RRCConnectionReconfiguration message of a higher layer may be used. The E-UTRAN may transmit a dedicated signal having a different parameter to each UE, rather than broadcasting a signal in the associated SCell.

After an initial security activation process begins, an E-UTRAN may configure a network by adding one or more SCells to a PCell initially configured in a connection establishment process. In a carrier aggregation environment, the PCell and the SCell may operate as respective CCs. In the following embodiments, a primary CC (PCC) may be used as the same meaning as the PCell and a secondary CC (SCC) may be used as the meaning as the SCell.

Figure 17:
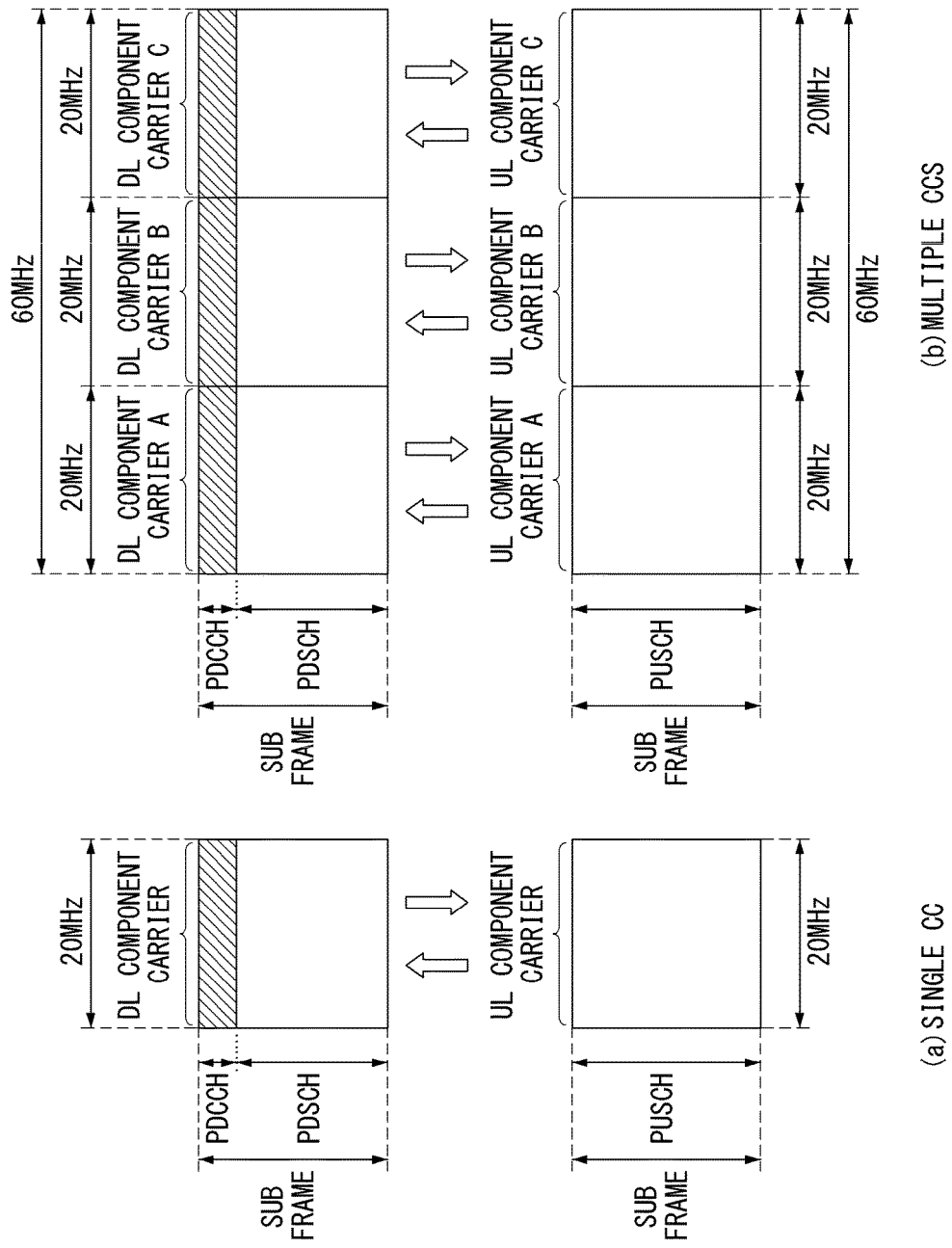
FIG. 17 represents an example of component carrier and carrier aggregation in the wireless communication system to which the present invention can be applied.

FIG. 17 represents an example of component carrier and carrier aggregation in the wireless communication system to which the present invention can be applied.

FIG. 17 (a) represents a single carrier structure that is used in a LTE system. There are DL CC and UL CC in component carrier. One component carrier may have 20 MHz frequency range.

FIG. 17 (b) represents a carrier aggregation structure that is used in a LTE-A system. FIG. 17 (b) represents a case that three component carriers having 20 MHz frequency are aggregated. There are three DL CCs and UL CCs respectively, but the number of DL CCs and UL CCs are not limited thereto. In case of the carrier aggregation, the UE enables to monitor three CCs at the same time, to receive the DL signal/data, and to transmit the UL signal/data.

If, N DL CCs are managed in a specific cell, the network may allocate M (M≤N) DL CCs. In this case, the UE may monitor the limited M DL CCs only and receive the DL signal. Also, the network may give a priority to L (L≤M≤N) DL CCs and have the prioritized DL CCs allocated to the UE, in this case, the UE should monitor the DL CCs without fail. This way may be applied for the UL transmission.

The linkage between the DL resource carrier frequency (or DL CC) and the UL resource carrier frequency (or UL CC) may be instructed by a higher layer message like RRC message or system information. For example, the combination of DL resource and UL resource may be configured by the linkage that is defined by system information block type 2 (SIB2). Particularly, the linkage may signify the mapping relationship between the DL CC through which the PDCCH carrying a UL grant is transmitted and the UL CC that uses the UL grant, or signify the mapping relationship between the DL CC (or UL CC) through which the data for HARQ is transmitted and the UL CC (or DL CC) through which the HARQ ACK/NACK signal is transmitted.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 18 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 18(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated before-hand, the resource for UL data should be requested starting from the SR transmission through the PUCCH, in this case, the UL resource allocation procedure of 5 steps is used.

Referring to FIG. 18(a), the case that the PUSCH resource for transmitting the BSR is not allocated to a UE is illustrated, and the UE transmits the scheduling request (SR) to an eNB first in order to be allocated with the PUSCH resources (step, S1801).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1803), the UE transmits the triggered BSR through the PUSCH resources which are allocated by the UL grant (step, S1805).

The eNB verifies the quality of data that the UE actually transmit to the UL through the BSR, and transmits the UL grant for the PUSCH resources for actual data transmission to the UE (step, S1807). The UE that receives the UL grant for actual data transmission transmits the actual UL data to the eNB through the PUSCH resources (step, S1809).

FIG. 18(b) exemplifies the UL resource allocation procedure for actual data in case that the UL radio resources for the BSR are allocated to a UE.

Referring to FIG. 18(b), the case that the PUSCH resources for BRS transmission are already allocated to a UE is illustrated. In the case, the UE transmits the BSR through the allocated PUSCH resources, and transmits a scheduling request to an eNB (step, S1811). Subsequently, the eNB verifies the quality of data to be transmitted to the UL by the UE through the BSR, and transmits the UL grant for the PUSCH resources for actual data transmission to the UE (step, S1813). The UE that receives the UL grant for actual data transmission transmits the actual UL data to the eNB through the allocated PUSCH resources (step, S1815).

Figure 19:
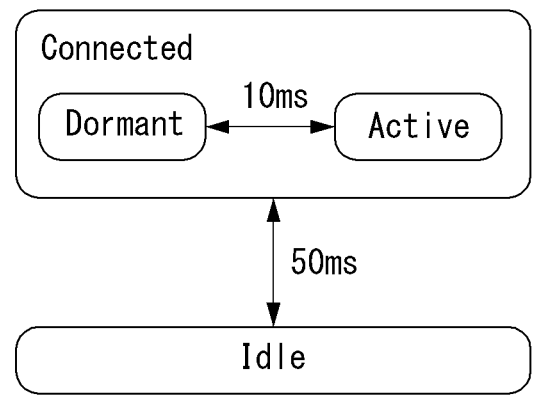
FIG. 19 is a diagram for describing a latency in C-plane required in 3GPP LTE-A to which the present invention can be applied.

FIG. 19 is a diagram for describing a latency in C-plane required in 3GPP LTE-A to which the present invention can be applied.

Referring to FIG. 19, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Figure 20:
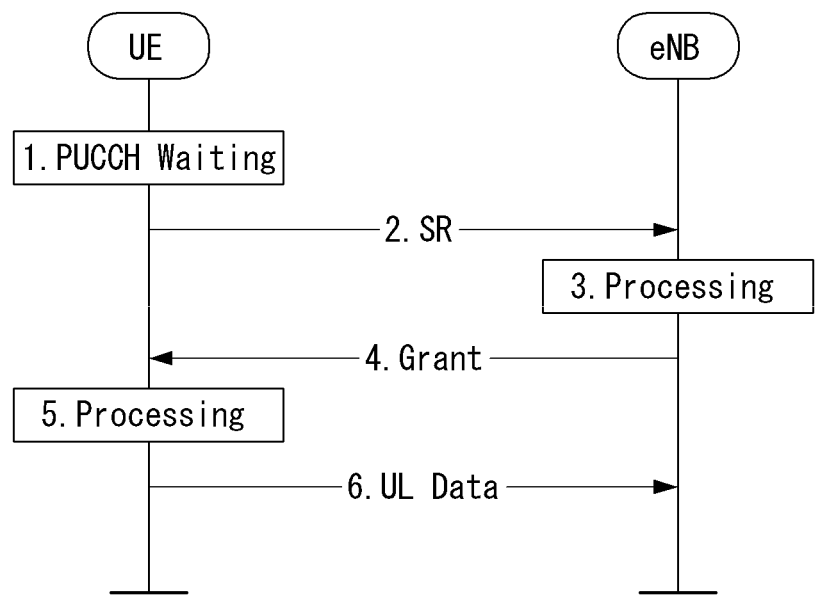
FIG. 20 is a diagram for describing a transition time from the dormant state to the active state for a synchronized UE required in 3GPP LTE-A to which the present invention can be applied.

Uplink initiated transition, synchronized
Uplink initiated transition, unsynchronized
Downlink initiated transition, synchronized
Downlink initiated transition, unsynchronized FIG. 20 is a diagram for describing a transition time from the dormant state to the active state for a synchronized UE required in 3GPP LTE-A to which the present invention can be applied.

In FIG. 20, the UL resource allocation procedure of 3 steps (in case of UL radio resources for the BSR are allocated) described in FIG. 18 above is illustrated. In LTE-A system, the latency is required for UL resource allocation as represented in Table 11 below.

Table 16 represents a transition time from the dormant state to the active state initiated by a UL transmission, in case of a synchronized UE which is required in LTE-A system.

TABLE 16

| Component | Description | Time [ms] |
|---|---|---|
| 1 | Average delay to next SR opportunity (1 ms/5 ms PUCCH cycle) | 0.5/2.5 |
| 2 | UE sends Scheduling Request | 1 |
| 3 | eNB decodes Scheduling Request and generates the Scheduling Grant | 3 |
| 4 | Transmission of Scheduling Grant | 1 |
| 5 | UE Processing Delay (decoding of scheduling grant + L1 encoding of UL data) | 3 |
| 6 | Transmission of UL data | 1 |
| | Total delay | 9.5/11.5 |

Referring to FIG. 20 and Table 16, as an average delay due to a RACH scheduling section that has a RACH cycle of 1 ms/5 ms, 0.5 ms/2.5 ms is required, and 1 ms is required for a UE to transmit the SR. And 3 ms is required for an eNB to decode the SR and generate the scheduling grant, and 1 ms is required to transmit the scheduling grant. And 3 ms is required for a UE to decode the scheduling grant and encode the UL data in L2 layer, and 1 ms is required to transmit the UL data.

As such, total 9.5/15.5 ms are required for a UE to complete a procedure of transmitting the UL data.

Accordingly, due to system characteristics of transmitting data based on scheduling by an eNB, the problem of increasing the latency even in case of transmitting UL data of a UE.

Particularly, in case of an intermittent application (e.g., a health care, a traffic safety, etc.) or an application in which fast transmission is required, such a data transmission method is not proper since it causes the latency inevitably.

A Scheduling Request Method Using Scheduling Request Resources Additionally Allocated In order to perform a HARQ operation in a receiving end, it is required to store data that are still not successfully decoded yet, and the storage for this is referred to as a soft buffer. That is, the soft buffer signifies a space in which the soft value is stored in the receiving end before performing a channel decoding for the data transmitted from a transmission end. The soft buffer is controlled for each transmission block (TB) (or a HARQ process).

In LTE/LTE-A system, in case of DL, a memory size of the soft buffer within a UE is determined according to a UE category. The UE reports its category information and the like to a network, and determines a size of the soft buffer for each transmission block by considering a UE capacity.

When transmitting DL data, an eNB does not notify a size of DL data to the UE. Instead, the eNB notifies only the information such as rank information, number of stream, etc.

For example, when the eNB transmits the DL data with four streams the UE logically divides the soft buffer into identical four sections, and stores them in the soft buffer for each stream.

On the other hand, in case of UL, an eNB configures the memory of soft buffer using the BSR information received from a UE. That is, the eNB is required to know the BSR information in order to configure a size of the soft buffer.

Figure 21:
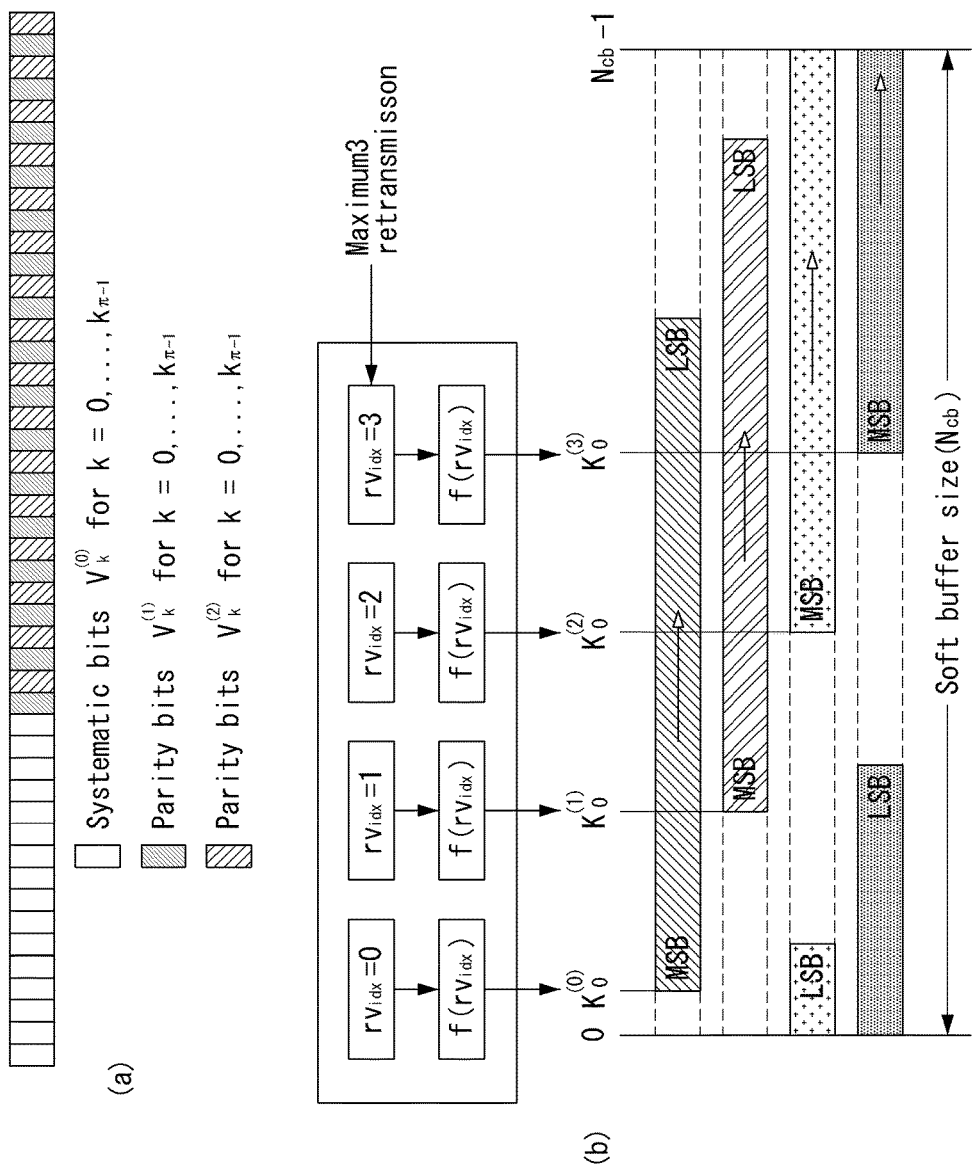
FIG. 21 is a diagram for describing the soft buffer in the wireless communication system to which the present invention can be applied.

FIG. 21 is a diagram for describing the soft buffer in the wireless communication system to which the present invention can be applied.

LTE/LTE-A physical layers are interfaced using the MAC layer and the transport channel which are higher layers. In order to detect error within the transport block which is encoded in the receiving end, a cyclic redundancy check is attached to the transport block transmitted from the MAC layer, and the transport block is divided by a code block in order to be fit to a code block size defined in a turbo code.

An additional CRC is attached to each code block, and the code block is inputted in a turbo encoder and to which a turbo encoding whose coding rate is 1/3 is applied. The code block is outputted from the turbo encoder as systematic bits, first parity bits and second parity bits.

Each of the systematic bits, the first parity bits and the second parity bits are interleaved through a subblock interleaver. The interleaved bits are stored in a virtual circular buffer.

FIG. 21(a) illustrates a code block stored in the virtual circular buffer.

In FIG. 21, $v_k^{(0)}$ (k=0, ..., $K_\pi$-1) represents interleaved systematic bits sequence, each of $v_k^{(1)}$ (k=0, ..., $K_\pi$-1) and $v_k^{(2)}$ (k=0, ..., $K_\pi$-1) represent interleaved parity bit sequences.

As shown in FIG. 21(a), the systematic bits are firstly stored in the virtual cyclic buffer, and the first parity bits and the second parity bits are alternately stored by one by one bit. The length of virtual cyclic buffer equals to $K_w=3K_\pi$.

Since a receiving side (i.e., an eNB that receives UL or a UE that receives DL) is required to store the data not successfully decoded yet in order to perform the HARQ process, for this, the receiving side should setup a soft buffer.

In case of the DL-SCH and the PCH transmission channel, a size $N_{cb}$ of the soft buffer for each code block is determined as Equation 6 below.

$$N_{cb} = \min\left(\left\lfloor \frac{N_{IR}}{C} \right\rfloor, K_w\right) \quad \text{[Equation 6]}$$

In Equation 6, C represents the number of code blocks. $N_{IR}$ represents the size of soft buffer for transmission block.

The soft buffer size $N_{IR}$ for transmission block is defined as Equation 7 below.

$$N_{IR} = \left\lfloor \frac{N_{soft}}{K_C \cdot K_{MIMO} \cdot \min(M_{DL\_HARQ}, M_{limit})} \right\rfloor \quad \text{[Equation 7]}$$

In Equation 7, floor(x) is a function that represents the biggest integer among integers that are the same or smaller than x, and min(x, y) is a function that represents a smaller value between x and y. $N_{soft}$ is a total number of soft channel bits. $N_{soft}$ is determined according to UE category. $K_{MIMO}$ is a value determined according to use of spatial multiplex. $M_{limit}$ is a constant value, and is 8.

On the other hand, in case of the UL-SCH and the MCH transmission channel, a size $N_{cb}$ of soft buffer for each code block is determined as Equation 8 below.

$$N_{cb} = K_w \quad \text{[Equation 8]}$$

In case of UL of Equation 8, an eNB configures the soft buffer in three fold size of UL data based on the BSR for each UE. For example, when transmitting the BSR reporting that the data to be transmitted by the UE is 10000, the eNB configures the soft buffer size in a size of 30000 (=3*10000).

As such, in the eNB, the soft buffer is always configured as three fold size of UL data for each UE, and this is because a mother coding rate (turbo encoding and decoding) is 1/3.

FIG. 21(b) is a diagram for describing a soft combining in the soft buffer.

In UL/DL data transmission and reception, errors may occur in the data transmitted according to channel environment, etc. As a way of error correction, the ARQ method or more improved form of HARQ method may be used. According to the HARQ method, in case that the data received in a reception end are not properly decoded, NACK is feedback to transmission end.

The reception end (i.e., an eNB or a UE) stores previously received data (i.e., data not properly decoded) in a soft buffer during a predetermined time, and soft combines the data retransmitted from the transmission end with the data of the same transmission block stored in the soft buffer and decode it. If there is no data to soft combine, the reception end performs decoding with the received data only.

In 3GPP LTE/LTE-A, the HARQ of incremental redundancy (IR) type is used, and a redundancy version (RV) is changed for every retransmission. An initial position within a buffer for retransmission is defined by RV values ($rv_{idx}$=0, 1, 2 or 3).

As described above, in case of UL, an eNB configures a size of soft buffer (i.e., three fold of UL data reported in the BSR) based on the BSR information received from a UE.

Table 17 illustrates buffer size labels for the BSR.

TABLE 17

| Index | Buffer Size (BS) value [bytes] |
|---|---|
| 0 | BS = |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |

TABLE 17-continued

| Index | Buffer Size (BS) value [bytes] |
|---|---|
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

Referring to Table 17, a UE divides the UL data size by 64 levels, and transmits the information of the UL data size to an eNB using the BSR of 6 bits. For example, in case that the UL data size to be transmitted is 350 byte, the UE transmits index value 24 to the eNB using the BSR of 6 bits.

If the eNB does not know the BSR information, the eNB should configure the soft buffer size by assuming that the UL data size is the biggest data size. As such, in case of configuring the soft buffer size under the assumption of the biggest data size, there is a drawback of inducing a memory waste of the eNB.

Similarly, if the eNB configures a soft buffer with an arbitrary determination of the data size, consequently, a case may occur that the data is not written in the soft buffer (i.e., a case that the UL data is greater than the soft buffer size) since the eNB does not know which size of data is transmitted from a UE. Therefore, if the eNB arbitrarily configures the soft buffer as such, the channel decoding is available in the eNB, but there is a drawback that a data loss occurs in the UL data.

As such, according to the conventional method, in order for the UE to transmit the UL data to the eNB, it is required to transmit the BSR to the eNB, and the UE always follows 5-step the UL data transmission method (or the 3-step UL data transmission method in case that the UL resource is pre-allocated to the BSR; refer to FIG. 18) regardless of which application generates the UL data or the data size.

That is, the UE transmits the information of the UL data that is going to be sent by the UE itself to the eNB through the BSR, and the eNB allocates the UL resource to the corresponding UE based on the BSR information.

However, in case of performing the general 5-step UL resource allocation procedure (or the UL data transmission procedure), it is unavoidable of the latency to occur according to the UL data transmission. Particularly, in order to transmit the UL data that is intermittently generated within a predetermined size (in particular, small size) or the UL data that is generated by an application which is sensitive to delay, it is preferable to decrease the latency.

Accordingly, as a method for omitting the transmission of the BSR in order for the UE to transmit the data of a predetermined size, the present invention proposes to omit the BSR transmission and to negotiate the buffer size to be basically used with the eNB, when the UE transmits the UL data for a service in which low latency is required, during the negotiation of capability.

If the method of omitting the BSR transmission according to the present invention is generally used for the fast transmission of small data, the data size for this may be a value that is not significantly changed.

Also, the UE may want to limit the data to which the BSR omitting method is to be applied to a predetermined service. The buffer size value that each UE is going to configure may be different according to the service characteristics.

Accordingly, the present invention proposes a method to allocate additional scheduling request (SR) for a predetermined application or a predetermined size of UL data, and to request the scheduling in which the BSR transmission can be omitted by configuring the buffer size according to the additional SR to be different by the service characteristics or each UE.

Figure 22:
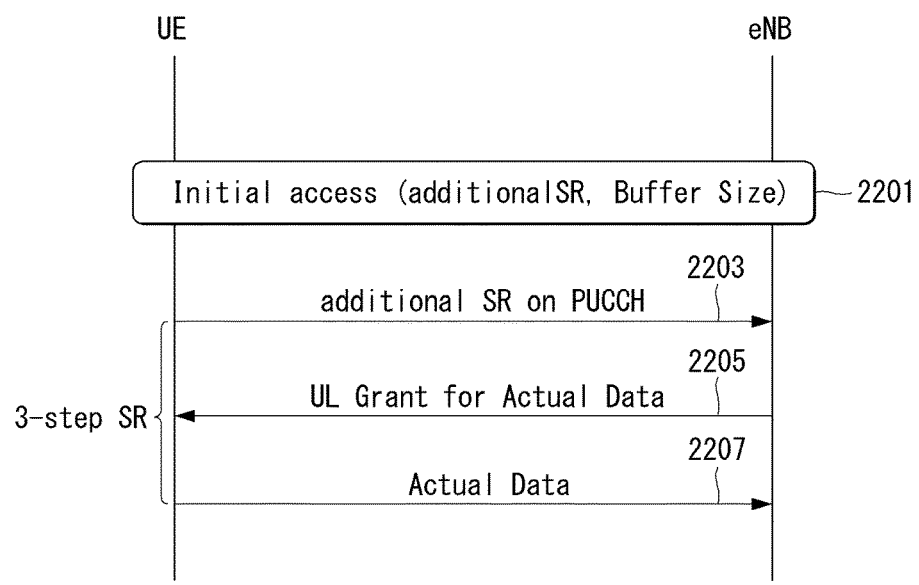
FIG. 22 illustrates a scheduling request method according to an embodiment of the present invention.

FIG. 22 illustrates a scheduling request method according to an embodiment of the present invention.

Referring to FIG. 22, when performing an initial access procedure to a network, a UE is allocated with an additional SR (or a negotiation SR (Nego_SR)) resource from an eNB (step, S2201).

The SR is also transmitted in the on/off keying method in the additionally allocated SR resource, which is the same as the SR resource (i.e., the SR resource that requests the UL data for the BSR transmission) allocated to the UE as a default, but the additionally allocated SR resource is configured with different PUCCH resource index from that of the SR resource which is allocated to the corresponding UE as a default. Also, an SR periodicity or an SR subframe offset may be configured, which is different from that of the SR resource allocated as a default.

In addition, corresponding to the SR resource additionally allocated to the UE, a data size (or a data range) is determined. Accordingly, if the SR is received from the SR resource additionally allocated, the eNB configures a buffer size based on the data size that corresponds to the corresponding additional SR resource.

As such, the SR resource is additionally allocated to the UE as well as the SR resource allocated to the UE as a default, the UE transmits the SRs to the eNB through a plurality of PUCCH resources.

The eNB may additionally allocate the SR resource to omit the BSR transmission preconfigured to the eNB through an RRC message when initially accessing to a network of UE without a negotiation with the UE. In this time, the RRC message is transmitted together with buffer size information used in the additional SR resource.

Also, the additional SR is configured from the eNB by the request of UE. In this case, the UE requests to additionally allocate the SR resource to omit the BSR through the RRC message when initially accessing to the network of UE. In this time, through the RRC message, a desired BSR size to be used for transmitting the corresponding additional SR is notified to the eNB.

When the eNB is requested to allocate additional SR resource from the UE through the RRC message, the eNB allocates additional SR resource to the UE in addition to the default SR resource through the RRC message.

The UE transmits the SR to the eNB through the PUCCH resource in order to be allocated with the PUSCH resource to transmit UL data (step, S2203).

Herein, the UE may transmit the SR to the eNB in the SR resource which is set as a default or in the SR resource additionally allocated. That is, according to UL data size to transmit, the SR is transmitted through one of SR resources among two or more SR resources allocated through the RRC message.

Accordingly, the eNB tries to detect the SR in both of the SR resource allocated as a default to the UE and the SR which is additionally allocated.

In FIG. 22, it is assumed that the UE transmits the SR through the SR resource which is additionally allocated in step, S2203.

The eNB that receives the SR through the SR resource which is additionally allocated acquires data size information which is determined corresponding to the additional SR resource, and transmits UL resource allocation information (i.e., UL grant) for the PUSCH resource to the UE based on the corresponding data size (step, S2205).

The UE that receives the UL grant for actual data transmission from the eNB transmits the actual UL data to the eNB through the PUSCH resource allocated by the UL grant (step, S2207).

As such, by configuring a plurality of SR types to the UE without alteration of the existing PUCCH format, the scheduling method according to the present invention may decrease the existing 5-step scheduling request procedure to 3-step scheduling request procedure.

When performing the RRC connection configuration or the RRC connection reconfiguration with the UE, the eNB may configure the SR of UE.

Hereinafter, a method of configuring a SR resource additionally allocated from the eNB and a buffer size which is used in the additional SR by the UE will be described.

Figure 23:
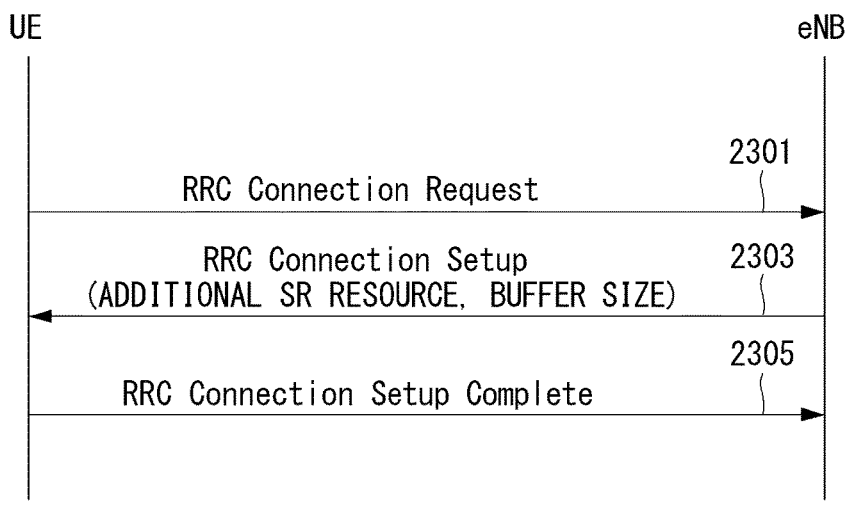
FIG. 23 illustrates a method for allocating an additional SR resource to a UE according to an embodiment of the present invention.

FIG. 23 illustrates a method for allocating an additional SR resource to a UE according to an embodiment of the present invention.

Referring to FIG. 23, a UE transmits a RRC connection request message to an eNB (step, S2301).

The RRC connection request message is used for requesting an establishment of the RRC connection.

The eNB transmits a RRC connection setup message to the UE in response to the RRC connection request (step, S2303).

The RRC connection setup message is used for establishing signaling radio bearer (SRB) 1.

Particularly, in the present invention, the RRC connection setup message includes a dedicated radio resource configuration (RadioResourceConfigDedicated) information element (IE).

The dedicated radio resource configuration (RadioResourceConfigDedicated) IE is used to setup/modify/release the radio bearer (RB), to modify a MAC main configuration, to modify a semi-persistent scheduling (SPS) configuration, and to modify a dedicated physical configuration.

The dedicated radio resource configuration (RadioResourceConfigDedicated) IE includes the dedicated physical configuration (physicalConfigDedicated) IE (or field).

The dedicated physical configuration (physicalConfigDedicated) IE includes a scheduling request configuration (SchedulingRequestConfig) IE (or field).

Herein, the scheduling request configuration (SchedulingRequestConfig) IE includes information of the SR resource which is allocated to the UE.

The eNB may configure one or more SR resources to the UE. In case that two or more SR resources are configured, as for the additional SR resource in addition to default SR resource, corresponding buffer size information is included.

The buffer size information may be transferred as an integer value x.

The buffer size which is configured corresponding to the additional SR resource may be differently configured for each SR. Also, the buffer size may be differently configured for each UE.

More detailed description for the scheduling request configuration (SchedulingRequestConfig) IE will be described below.

After the UE receives the RRC connection setup message from the eNB, the UE enters an RRC connection (RRC_connected) mode.

And the UE transmits a RRC connection setup complete message to the eNB (step, S2305).

The RRC connection setup complete message used for verifying that the RRC connection establishment is successfully completed.

Meanwhile, in case that the eNB configures only one SR resource to the UE when performing the RRC connection setup with the UE, the UE may request the configuration of an additional SR resource to the eNB.

Figure 24:
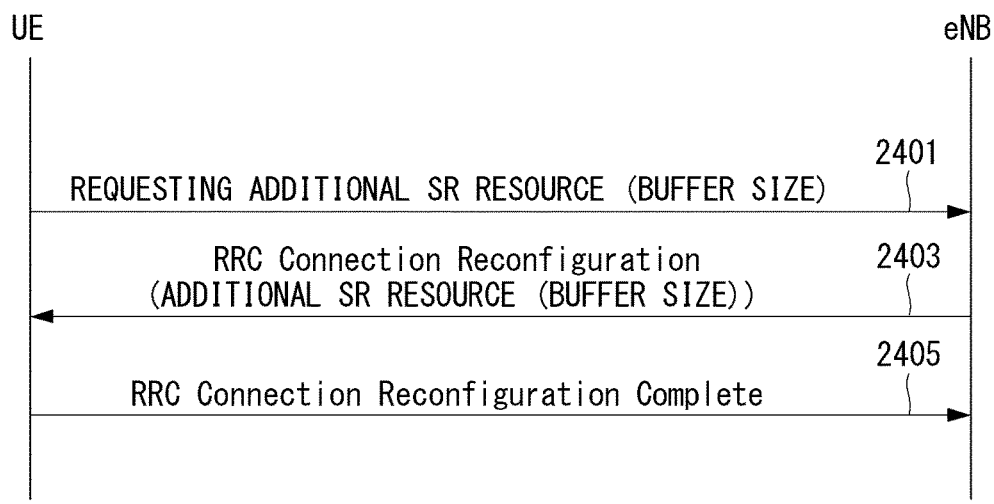
FIG. 24 illustrates a method for allocating an additional SR resource to a UE according to an embodiment of the present invention.

FIG. 24 illustrates a method for allocating an additional SR resource to a UE according to an embodiment of the present invention.

Referring to FIG. 24, a UE transmits a message to request a configuration of an additional SR resource to an eNB (step, S2401).

Herein, the UE may additionally request the configuration of additional SR resource to the eNB through the RRC connection setup complete message or a UE capability information message.

The RRC connection setup complete message or the UE capability information message includes an additional SR configuration request parameter (or field) and a buffer size parameter (or a field).

The additional SR configuration request parameter signifies a parameter for requesting a configuration of the additional SR resource in addition to the default SR resource allocated to the UE to the eNB in order to omit the BSR transmission.

In case that the additional SR resource is requested through the additional SR configuration request parameter, the buffer size parameter signifies a parameter for configuring a buffer size which is meaningful in the corresponding SR. That is, the buffer size parameter is a parameter for requesting a buffer size that corresponds to and is configured to the additional SR resource in order for the eNB to know a UL data size that the UE is going to send when the UE transmits the SR through the additional SR resource.

The buffer size parameter may be transferred with an integer value x.

The UE may additionally request one or more SR resources. In case that the UE additionally requests two or more SR resources, buffer size parameters may be included with corresponding to each of the SR resources.

More detailed description for the scheduling request configuration (SchedulingRequestConfig) IE will be described below.

The eNB that is requested to configure an additional SR from the UE transmits an RRC connection reconfiguration message to the UE to allocate the additional SR resource to the UE (step, S2403).

In the present invention, the RRC connection reconfiguration message includes a dedicated radio resource configuration (RadioResourceConfigDedicated) information element (IE).

The dedicated radio resource configuration (RadioResourceConfigDedicated) IE is used to setup/modify/release the radio bearer (RB), to modify a MAC main configuration, to modify a semi-persistent scheduling (SPS) configuration, and to modify a dedicated physical configuration.

The dedicated radio resource configuration (RadioResourceConfigDedicated) IE includes the dedicated physical configuration (physicalConfigDedicated) IE (or field).

The dedicated physical configuration (physicalConfigDedicated) IE includes a scheduling request configuration (SchedulingRequestConfig) IE (or field).

Herein, the scheduling request configuration (SchedulingRequestConfig) IE includes information of the SR resource additionally allocated to the UE and buffer size information that corresponds to the corresponding SR resource.

Herein, the eNB may configure the buffer size to be identical to the buffer size requested with corresponding to the SR resource in the UE in step, S2401, or differently configure the buffer size. For example, a case is assumed that 30 is requested as the buffer size value that corresponds to SR resource 1 and 200 is requested as the buffer size value that corresponds to SR resource 2, while the UE requests configurations of two SR resources. In this case, the eNB may allocate 30 as the buffer size value that corresponds to the SR resource 1 and allocate 200 as the buffer size value that corresponds to the SR resource 2 in the same manner. Also, the eNB may allocate 30 as the buffer size value that corresponds to the SR resource 1 and allocate 100 (or 250) as the buffer size value that corresponds to the SR resource 2 in different manner.

The buffer size information may be transferred as an integer value x.

The buffer size configured with corresponding to the additional SR resource may be differently configured for each SR. Also, the buffer size may be differently configured for each UE.

More detailed description for the scheduling request configuration (SchedulingRequestConfig) IE will be described below.

And the UE transmits an RRC connection setup complete message to the eNB (step, S2405).

The RRC connection setup complete message is used for verifying that the RRC connection establishment is successfully completed.

Hereinafter, the scheduling request configuration (SchedulingRequestConfig) IE will be described.

Table 18 illustrates the scheduling request configuration (SchedulingRequestConfig) IE according to the present invention.

TABLE 18

```
-- ASN1START
    SchedulingRequestConfig ::=    CHOICE {
        release
    NULL,
        setup
    SEQUENCE {
        sr0-PUCCH_ResourceIndex                INTEGER
```

TABLE 18-continued

```
    {0..20471},
        sr0-ConfigIndex                        INTEGER
    {0..157},
        dsr0-TransMax
        ENUMERATED {n4, n8, n16,
        n32, n64, ...}
        sr1-PUCCH_ResourceIndex                INTEGER
    {0..20471},
        sr1-ConfigIndex                        INTEGER
    {0..157},
        dsr1-TransMax
        ENUMERATED {n4, n8, n16,
        n32, n64, ...}
        sr1-BufferSize                         INTEGER
    {0..63}
        sr2-PUCCH_ResourceIndex                INTEGER
    {0..2047},
        sr2-ConfigIndex                        INTEGER
    {0..157},
        dsr2-TransMax
        ENUMERATED {n4, n8, n16,
        n32, n64, ...}
        sr2-BufferSize                         INTEGER
```

Referring to Table 18, such as SR type 0, SR type 1, SR type 2, . . . , 'dsr-TransMax' field, 'sr-ConfigIndex' field, 'sr-PUCCH-ResourceIndex' (and/or 'sr-PUCCH-ResourceIndexP1') field for each SR type may be defined.

The 'dsr-TransMax' field is a parameter that represents maximum transmission times of the SR. The n4 value represents four transmissions, the n8 value represents eight transmissions, and so do the remaining cases.

The 'sr-ConfigIndex' field represents a value of SR configuration index $I_{SR}$ that indicates the SR periodicity $SR_{PERIODICITY}$ and the SR subframe offset $N_{OFFSET,SR}$ (refer to Table 13).

The 'sr-PUCCH-ResourceIndex' and the 'sr-PUCCH-ResourceIndexP1' represent the PUCCH resource indexes $n_{PUCCH,SRI}^{(1,\tilde{p})}$ for antenna ports P0 and P1, respectively.

As such, for each SR type, the PUCCH resource index $n_{PUCCH,SRI}^{(1,\tilde{p})}$, the SR configuration index $I_{SR}$ and the SR transmission times may be configured.

That is, at least one of the physical uplink control channel (PUCCH) resource index for transmitting the SR for each SR which is configured in the UE, the SR periodicity, or the SR subframe offset may be differently configured.

Herein, SR type 0 corresponds to the SR configuration for transmitting the existing BSR of 6 bits, and SR type 1 and SR type 2 correspond to the SR types which are additionally configured by the eNB (or the network) or the request of UE.

In addition, the additionally configured SR type further includes 'sr-BufferSize' field.

The 'sr-BufferSize' field represents the buffer size configured for the corresponding SR type. The 'sr-BufferSize' field may be represented as an integer value selected from the buffer size levels distinguished by total 64 as exemplified by Table 17 above.

As described above, the UE may receive the scheduling request configuration (SchedulingRequestConfig) IE for configuring the SR resource additionally allocated from the eNB through the RRC message. For example, the UE may receive it from the eNB through the RRC connection setup message or the RRC connection reconfiguration message.

The SR resources correspond to the logical indexes of PUCCH formats 1/1a/1b by 1 to 1. That is, the SR resources are allocated as Equation 9 below.

$$n_{PUCCH}^{(1,\tilde{p})} = n_{PUCCH,SRI}^{(1,\tilde{p})} \qquad [\text{Equation 9}]$$

Eventually, this signifies that the resource allocation of PUCCH format 1 is simply further configured by n according to two or more (i.e., n) configurations of SR resource.

Accordingly, the scheduling request method according to the present invention signifies that the UE transmits the SR through a plurality of PUCCH resources by allocating a plurality of SR resources to the UE for each SR.

Hereinafter, the SR resource configured to each SR will be described with reference to drawings in more detail.

Figure 25:
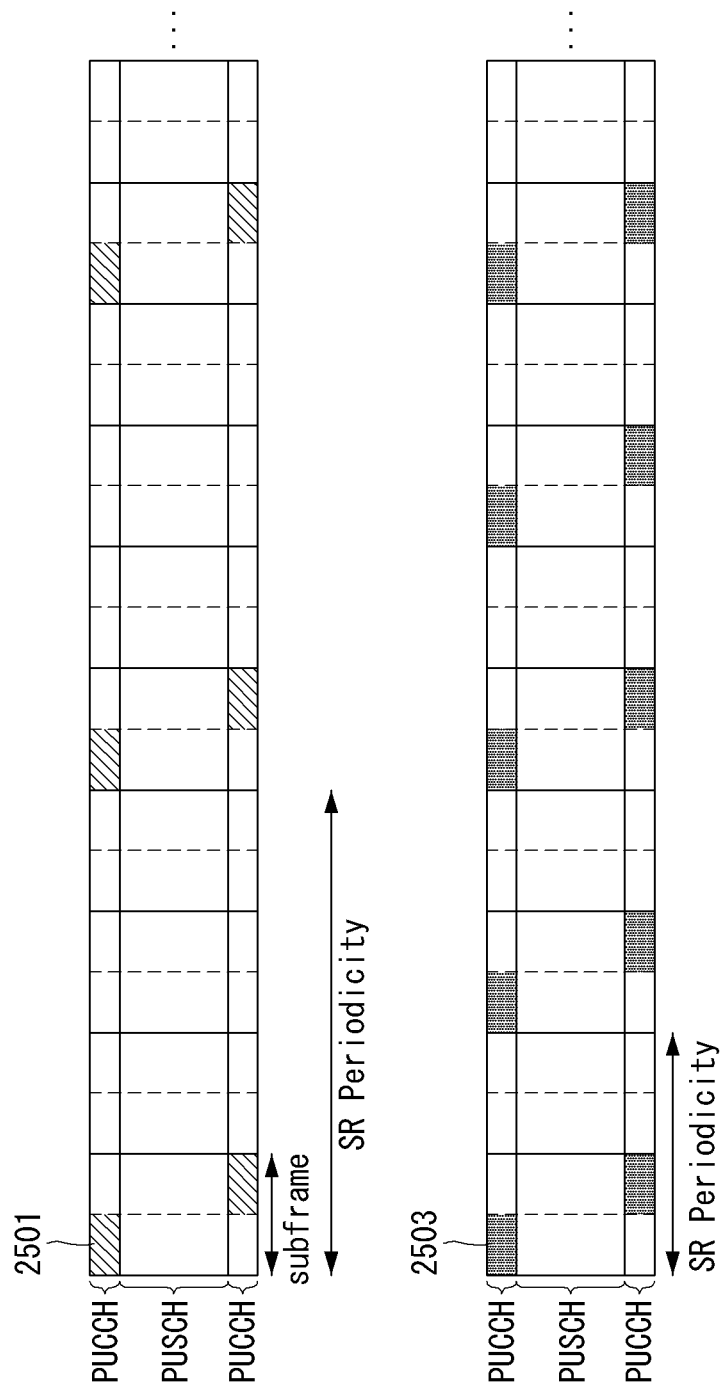
FIG. 25 is a diagram for describing a default SR resource and an additional SR resource according to an embodiment of the present invention.

FIG. 25 is a diagram for describing a default SR resource and an additional SR resource according to an embodiment of the present invention.

As described above, a plurality of SRs may be allocated to a UE, and different SR resources may be configured to each SR.

Herein, the SR resource is determined as a combination of the PRB in which the SR is transmitted, the cyclic shift (CS) applied to a basic sequence (e.g., ZC sequence) for a frequency domain spread of the SR, and the orthogonal code (OC) for a time domain spread of the SR.

In FIG. 25, it is assumed that an SR resource 2501 configured to SR type 1 (i.e., the default SR) and an SR resource 2503 configured to SR type 2 (i.e., the additional SR) are configured in an identical PRB in an identical subframe index.

In this case, an eNB may distinguish the SR resource 2501 according to SR type 1 and the SR resource 2503 according to SR type 2 by combination of the cyclic shift (CS) and the orthogonal code (OC).

For example, whereas CS index 1 and OC index 1 may be applied to the SR resource 2501 according to SR type 1, CS index 2 and OC index 3 may be applied to the SR resource 2503 according to SR type 2. In this case, even though SR type 1 and SR type 2 are simultaneously transmitted in an identical PRB, the eNB may detect each SR by the combination of CS and OC.

If the SR resource 2501 according to SR type 1 and the SR resource 2503 according to SR type 2 are configured in different PRBs in an identical subframe index, the eNB may distinguish SR type 1 and SR type 2 with the PRBs.

In addition to this, the SR resources may be determined based on the SR periodicity and the SR subframe offset information.

In FIG. 25, it is assumed that the SR periodicity of the SR resource 2501 according to SR type 1 is configured as four subframes and the SR periodicity of the SR resource 2503 according to SR type 2 is configured as two subframes. In addition, it is assumed that the subframe offsets of the SR resource 2501 according to SR type 1 and the SR resource 2503 according to SR type 2 are the same.

In other words, the SR resource 2501 according to SR type 1 is allocated to subframe index 0, subframe index 4, subframe index 8, etc., and SR resource 2503 according to SR type 2 is allocated to subframe index 2, subframe index 4, subframe index 6, subframe index 8, etc.

In this case, in case that the subframe in which the SR resource 2501 according to SR type 1 is transmitted and the subframe in which the SR resource 2503 according to SR type 2 are overlapped, the eNB may try to detect both of SR type 1 and SR type 2. On the other hand, in case that the subframe in which the SR resource 2501 according to SR type 1 is transmitted and the subframe in which the SR resource 2503 according to SR type 2 are not overlapped, the eNB may try to detect either one of SR type 1 or SR type 2.

Figure 26:
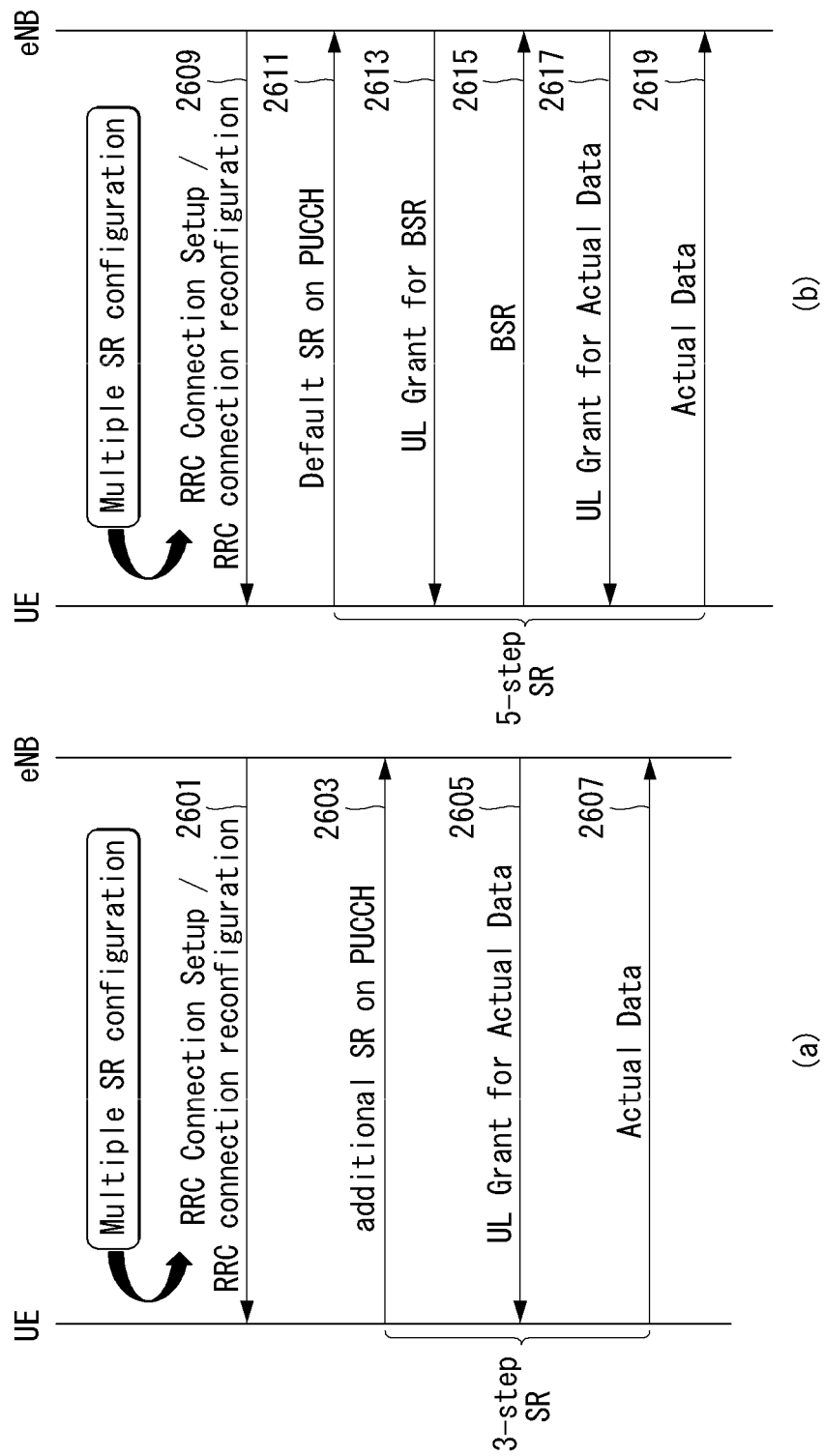
FIG. 26 is a diagram for describing a UL resource allocation procedure using an additional SR resource according to an embodiment of the present invention.

FIG. 26 is a diagram for describing a UL resource allocation procedure using an additional SR resource according to an embodiment of the present invention.

FIG. 26(a) illustrates a procedure of allocating UL resources through the additionally allocated SR resource, and FIG. 26(b) illustrates a procedure of allocating UL resources through the SR resource allocated as a default.

Referring to FIG. 26, by receiving the RRC connection setup message or the RRC connection reconfiguration message from an eNB, a UE is allocated with an additional SR resource in addition to the default SR resource (steps, S2601 and S2609).

In addition, as illustrated in FIG. 24, the UE may additionally request a configuration of SR resource through the RRC connection setup complete message or the UE capability information message, and the UE may be allocated with the additional SR resource in addition to the default SR resource.

Later, the UE compares a buffer size configured with corresponding to the SR resource additionally allocated and a data size to be transmitted to UL, and transmits the SR to request a UL resource allocation to the eNB through the default SR resource or the additional SR resource.

Herein, both of the default SR and the additional SR are transmitted with an on/off keying method, but the PUCCH resource index is differently configured according to the SR type.

The eNB tries to detect all types of SR configured to the UE, and transmits the UL resource allocation information determined according to the resource in which the SR is transmitted (i.e., the default SR resource or the additional SR resource).

First, a case that the UE uses the additional SR resource will be described.

If UL data whose size is the same as a buffer size configured to the additional SR resource or smaller than this is generated, the UE allocated with two or more SR resources (i.e., the UE allocated with additional SR resource) transmits the SR to the eNB using the SR resource that corresponds to a buffer size configured to be allocated with the PUSCH resource for corresponding data transmission (step, S2603).

In more detail, in case that one additional SR resource is allocated to the UE, and in case that data whose size is the same as or smaller than the buffer size x configured with corresponding to the additional SR resource, the UE may transmit the SR using the SR resource defined for the corresponding buffer size x.

When three or more SR are configured to the UE (i.e., two or more additional resources are configured), if UL data whose size corresponds to more than n−1$^{th}$ buffer size $X_{n-1}$ and less than n$^{th}$ buffer size $X_n$ is generated, the UE may transmit the SR through the n$^{th}$ SR resource.

The UE receives the UL resource allocation information (UL grant) for the PUSCH resource for the UL data transmission from the eNB (step, S2605).

That is, if the eNB receives the SR from the UE through the additional SR resource, the eNB transmits the UL grant for the PUSCH resource as much as the buffer size configured with corresponding to the additional SR resource. And the eNB configures a soft buffer size based on the buffer size configured with corresponding to the additional SR resource received from the UE.

The UE that receives the UL grant for the actual data transmission from the eNB transmits the actual UL data to the eNB through the PUSCH resource allocated by the UL grant (step, S2607).

Next, a case that the UE uses the default SR resource will be described.

The UE allocated with two or more SR resources (i.e., the UE allocated with additional SR resource) transmits the SR (i.e., the SR for the BSR transmission) using the default SR resource in order to be allocated with the PUSCH resource for the buffer size which is not fixed (step, S2611).

That is, by transmitting the SR through the default SR resource, the UE requests to allocate UL resource for the BSR transmission.

The UE receives the UL resource allocation information (UL grant) for the PUSCH resource for the BSR transmission from the eNB (step, S2613).

The UE that receives the UL grant for the BSR from the eNB transmits the triggered BSR through the PUSCH resource allocated by the UL grant to the eNB (step, S2615).

The eNB detects the amount of actual data that the UE is going to transmit to UL through the BSR, and transmits the UL grant for the PUSCH resource for the actual data transmission (step, S2617).

The UE that receives the UL grant for the actual data transmission transmits the actual UL data to the eNB through the PUSCH resource which is allocated (step, S2619).

Figure 27:
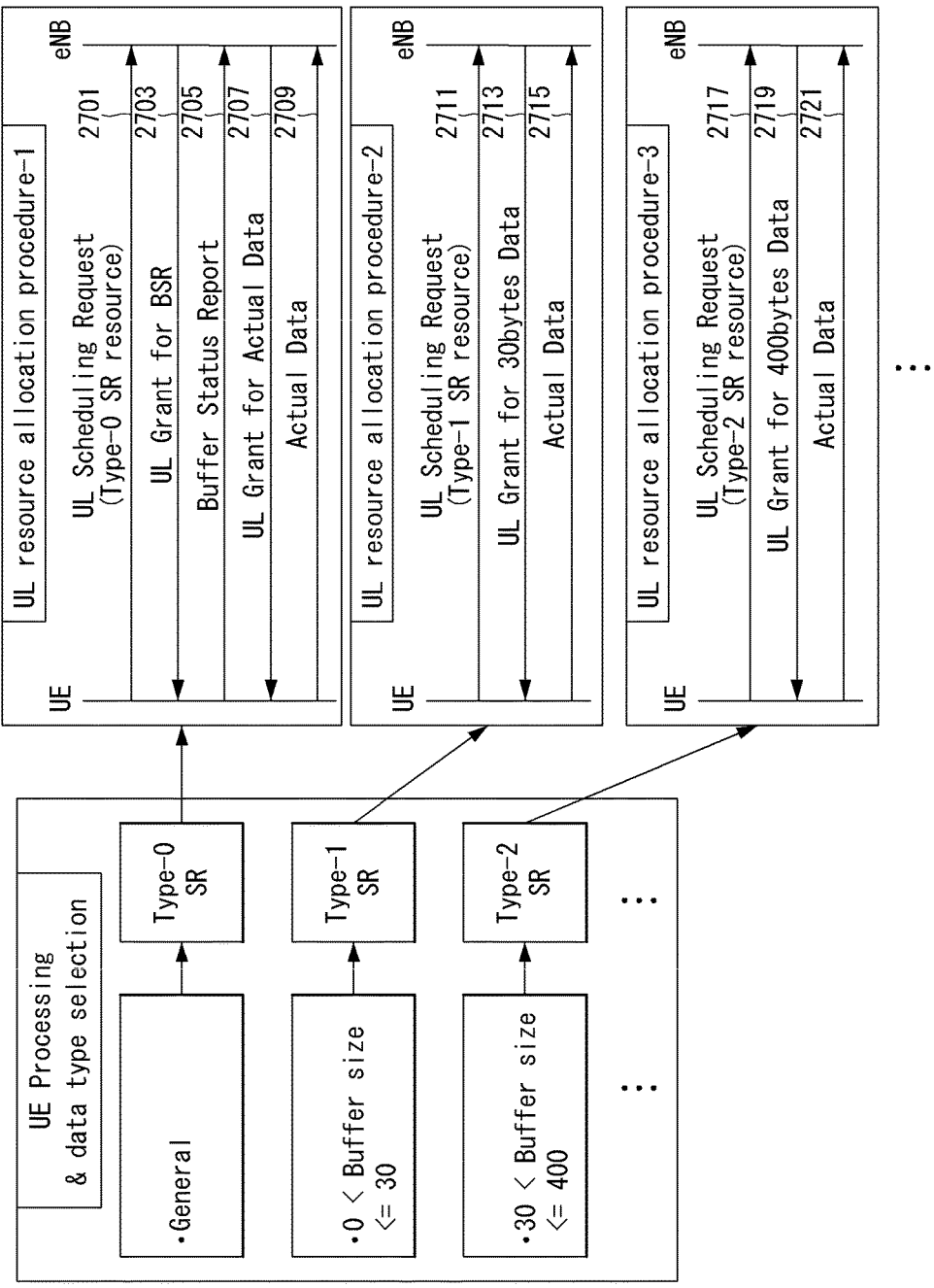
FIG. 27 is a diagram for describing a UL resource allocation procedure using an additional SR allocation resource according to an embodiment of the present invention.

FIG. 27 is a diagram for describing a UL resource allocation procedure using an additional SR allocation resource according to an embodiment of the present invention.

In FIG. 27, it is assumed that buffer sizes are configured for each of a plurality of SR types as follows.

First, SR type 0 (Type-0 SR) is an SR which is allocated to a UE as a default, and may be used when the UE uses an SR procedure for transmitting general UL data.

And, SR type 1 (Type-1 SR) is an SR which is additionally allocated to a UE, and may be used when the UE uses an SR procedure for transmitting UL data whose size belongs to a range of buffer size (0<buffer size≤30) configured for the corresponding SR type.

And, SR type 2 (Type-2 SR) is an SR which is additionally allocated to a UE, and may be used when the UE uses an SR procedure for transmitting UL data whose size belongs to a range of buffer size (i.e., 30<buffer size≤400) configured for the corresponding SR type.

Hereinafter, the UL resource allocation procedure for SR type 0, SR type 1 and SR type 2 will be described.

The UE configured with a plurality of SR types transmits a scheduling request to an eNB in order to be allocated with the PUSCH resource for the UL data transmission (steps, S2701, S2711 and S2717).

Herein, the UE transmits the SR type selected according to the UL data size to send on the PUCCH to the eNB.

As described above, the SR type that the UE transmits is determined according to the resource in which the SR is transmitted. That is, the UE transmits the SR through the SR resource that corresponds to the selected SR type to the eNB.

Such a plurality of SR resources may be configured in UE-specific manner by a higher layer (e.g., the RRC layer). Also, configurations of the plurality of SR resources may be changed dynamic manner or semi-static manner.

In case of FIG. 27, if the UE transmits the SR in the SR resource that corresponds to SR type 0, the eNB may distinguish the received SR to be SR type 0 through an energy detection (i.e., on/off detection). Similarly, if the UE transmits the SR in the SR resource that corresponds to SR type 1 or SR type 2, the eNB may distinguish the received SR to be SR type 1 or SR type 2 through an energy detection (i.e., on/off detection).

The eNB determines the SR type according to the SR resource received from the UE, and proceeds to the UL resource allocation procedure according to the determined SR type.

First, in case that the UE transmits SR type 0 to the eNB, the eNB may perform the general 5-step UL resource allocation procedure in the resource of SR type 0.

That is, like the example of FIG. 18(a), the eNB transmits the UL grant or the PUSCH resource for the BSR transmission to the UE (step, S2703).

The UE that receives the UL grant for the BSR from the eNB transmits the triggered BSR through the PUSCH resource allocated by the UL grant to the eNB (step, S2705).

The eNB detects the amount of actual data that the UE is going to transmit to UL through the BSR, and transmits the UL grant for the PUSCH resource for the actual data transmission (step, S2707). Herein, the eNB configures the soft buffer size that corresponds to the data size that the UE is going to send to UL through the BSR.

The UE that receives the UL grant for the actual data transmission from the eNB transmits the actual UL data to the eNB through the PUSCH resource which is allocated (step, S2709).

Next, in case that the UE transmits SR type 1 to the eNB, the eNB may perform the 3-step UL resource allocation procedure without the BSR request (i.e., UL resource allocation for the BSR and the BSR transmission by the UE).

That is, the eNB transmits the UL grant for the PUSCH resource for the actual data transmission to the UE (step, S2713).

Herein, the PUSCH resource allocated for actual data transmission may be determined according to the buffer size (i.e., 0<buffer size≤30) that the UE notifies to the eNB through SR type 1 in step, S2711. And, the eNB configures the soft buffer size (e.g., 90=30*3) that corresponds to the buffer size.

The UE transmits the actual data to the eNB through the PUSCH resource allocated by the UL grant from the eNB (step, S2715).

Nest, in case that the UE transmits SR type 2 to the eNB, the eNB may perform the 3-step UL resource allocation procedure without the BSR request (i.e., UL resource allocation for the BSR and the BSR transmission by the UE).

That is, the eNB transmits the UL grant for the PUSCH resource for the actual data transmission to the UE (step, S2717).

Herein, the PUSCH resource allocated for actual data transmission may be determined according to the buffer size (i.e., 30<buffer size≤400) that the UE notifies to the eNB through SR type 2 in step, S2717. And, the eNB configures the soft buffer size (e.g., 1200=3*400) that corresponds to the buffer size.

The UE transmits the actual data to the eNB through the PUSCH resource allocated by the UL grant from the eNB to the eNB (step, S2721).

Apparatus for Implementing the Present Invention

Figure 28:
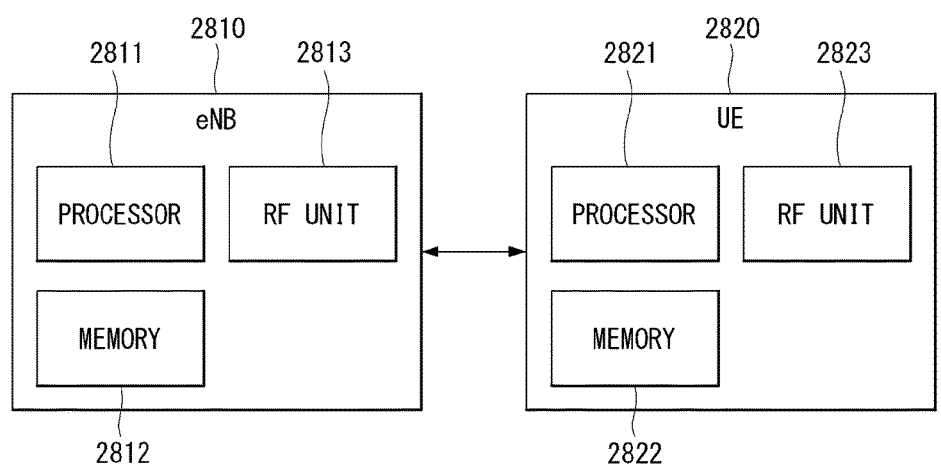
FIG. 28 is a block diagram of a wireless communication apparatus according to an embodiment of the present invention.

FIG. 28 is a block diagram of a wireless communication apparatus according to an embodiment of the present invention.

Referring to FIG. 28, a wireless communication system includes an eNB 2810 and a plurality of UEs 2820 belonging to the eNB 2810.

The eNB 2810 includes a processor 2811, a memory 2812, a radio frequency (RF) unit 2813. The processor 2811 may be configured to implement the functions, procedures and/or methods proposed by the present invention as described in FIGS. 1-27. Layers of a wireless interface protocol may be implemented by the processor 2811. The memory 2812 is connected to the processor 2811 and stores various types of information for operating the processor 2811. The RF unit 2813 is connected to the processor 2811, transmits and/or receives an RF signal.

The UE 2820 includes a processor 2821, a memory 2822, and an RF unit 2823. The processor 2821 may be configured to implement the functions, procedures and/or methods proposed by the present invention as described in FIGS. 1-27. Layers of a wireless interface protocol may be implemented by the processor 2821. The memory 2822 is connected to the processor 2811 and stores information related to operations of the processor 2822. The RF unit 2823 is connected to the processor 2811, transmits and/or receives an RF signal.

The memories 2812 and 2822 may be located inside or outside the processors 2811 and 2821 and may be connected to the processors 2811 and 2821 through various well-known means. The eNB 2810 and/or UE 2820 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the method for requesting scheduling for transmitting UL data in the wireless communication system of the present invention is described mainly for the example applied to 3GPP LTE/LTE-A system, it is also possible to be applied to various wireless communication system as well as 3GPP LTE/LTE-A system.

The invention claimed is:

1. A method performed by an user equipment (UE) for requesting scheduling for an uplink data transmission in a wireless communication system, the method comprising:
receiving additional scheduling request (SR) resource configuration information including additional SR resource information and buffer size information configured to an additional SR resource in addition to a default SR resource from a base station;
transmitting an SR through the default SR resource or the additional SR resource to the base station;
receiving, from the base station, uplink resource allocation information which is determined according to the resource in which the SR is transmitted by the user equipment; and
transmitting, by the user equipment, uplink data to the base station through a physical uplink shared channel (PUSCH) resource which is allocated by the uplink resource allocation information,
wherein the SR is transmitted to the base station through the additional SR resource, if an uplink data size is same as or smaller than a buffer size.

2. The method of claim 1, wherein the additional SR resource configuration information is transmitted through a radio resource control (RRC) connection setup message or an RRC connection reconfiguration message.

3. The method of claim 1, further comprising:
requesting, by the user equipment, the additional SR resource and the size of the buffer which is configured in the additional SR resource.

4. The method of claim 3, wherein the additional SR resource and the size of the buffer which is configured in the additional SR resource is requested through a radio resource control (RRC) connection setup complete message or a UE capability information message.

5. The method of claim 1, wherein a size of the PUSCH resource which is allocated by the uplink resource allocation information is determined based on the buffer size.

6. The method of claim 1, wherein the additional SR resource configuration information further includes at least one of physical uplink control channel (PUCCH) resource index information for each of multiple SR types or SR subframe offset information.

7. The method of claim 1, wherein at least one of a physical uplink control channel (PUCCH) resource index for transmitting the SR, an SR periodicity or an SR subframe offset is differently configured to the default SR resource and the additional SR resource.

8. The method of claim 1, wherein a soft buffer size configured by the base station is determined based on the buffer size configured to the additional SR resource.

9. The method of claim 1, wherein the SR is transmitted to the base station through the default SR resource, if an SR for a buffer status report (BSR) transmission is transmitted.

10. The method of claim 9, further comprising:
receiving, by the user equipment, the uplink resource allocation information for the BSR transmission from the base station; and
transmitting, by the user equipment, a BSR to the base station through the PUSCH resource which is allocated by the uplink resource allocation information for the BSR transmission.

11. A user equipment for requesting scheduling for an uplink data transmission in a wireless communication system, comprising:
a radio frequency (RF) transceiver for transmitting and receiving a radio signal; and
a processor,
wherein the processor is configured to perform:
receiving additional scheduling request (SR) resource configuration information including additional SR resource information and buffer size information configured to an additional SR resource in addition to a default SR resource from a base station;
transmitting an SR through the default SR resource or the additional SR resource to the base station;

receiving, from the base station, uplink resource allocation information which is determined according to the resource in which the SR is transmitted by the user equipment; and transmitting uplink data to the base station through a physical uplink shared channel (PUSCH) resource which is allocated by the uplink resource allocation information, wherein the SR is transmitted to the base station through the additional SR resource, if an uplink data size is same as or smaller than a buffer size.

* * * * *